United States Patent
Fujisawa

(10) Patent No.: US 8,167,721 B2
(45) Date of Patent: May 1, 2012

(54) PROGRAM FOR OBJECT MOVEMENT STORED IN A NON-TRANSITORY COMPUTER READABLE STORAGE MEDIUM AND OBJECT MOVEMENT GAME APPARATUS

(75) Inventor: Yasuhito Fujisawa, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 242 days.

(21) Appl. No.: 12/611,258

(22) Filed: Nov. 3, 2009

(65) Prior Publication Data

US 2011/0059792 A1 Mar. 10, 2011

(30) Foreign Application Priority Data

Sep. 9, 2009 (JP) ................................. 2009-208073

(51) Int. Cl.
A63F 9/24 (2006.01)
(52) U.S. Cl. .......................................... 463/36; 463/37
(58) Field of Classification Search .................... 463/36, 463/37
See application file for complete search history.

(56) References Cited

U.S. PATENT DOCUMENTS

| | | | | |
|---|---|---|---|---|
| 2008/0287189 A1* | 11/2008 | Rabin | ............................. | 463/36 |
| 2010/0087248 A1* | 4/2010 | Takahashi | ........................ | 463/30 |
| 2010/0144447 A1* | 6/2010 | Nonaka et al. | ................... | 463/43 |
| 2010/0292007 A1* | 11/2010 | Rabin et al. | ..................... | 463/36 |
| 2011/0294581 A1* | 12/2011 | Abe et al. | ......................... | 463/43 |
| 2012/0004035 A1* | 1/2012 | Rabin | ............................. | 463/36 |

OTHER PUBLICATIONS

"What Kind of Game is Touch Panic?," [online], Nintendo DS, [retrieved on Aug. 8, 2009].
"Rules of Tetris,"[online], Nintendo DS, [retrieved on Aug. 8, 2009].
"Flip and Move Numbers Using Touch Stylus," [online], Nintendo DS, [retrieved on Aug. 8, 2009].

* cited by examiner

Primary Examiner — Pierre E Elisca
(74) Attorney, Agent, or Firm — Nixon & Vanderhye P.C.

(57) ABSTRACT

Initially, a move target object is set from a plurality of objects. Next, a movement direction of the set move target object is decided. Next, for the decided movement direction, it is determined whether or not a rotation movement condition or a flip-over movement condition is satisfied. Next, when it is determined that the rotation movement condition is satisfied, the move target object is moved in a rotated form thereof in the movement direction, and when it is determined that the flip-over movement condition is satisfied, the move target object is moved in a flipped-over form thereof in the movement direction.

15 Claims, 19 Drawing Sheets

FIG. 20
EXAMPLES OF OBJECT TYPES AND DISPLAY ORIENTATIONS
| | ORIENTATION 1 | ORIENTATION 2 | ORIENTATION 3 | ORIENTATION 4 |
|---|---|---|---|---|
| L-SHAPED PIPE TILE |  |  |  |  |
| I-SHAPED PIPE TILE |  |  | | |
| NON-PIPE TILE |  | | | |
| NOZZLE OBJ |  | | | |
| ENERGY OBJ |  | | | |
FIG. 21
EXAMPLES OF SILHOUETTE TYPES AND DISPLAY ORIENTATIONS
| | ORIENTATION 1 | ORIENTATION 2 | ORIENTATION 3 | ORIENTATION 4 |
|---|---|---|---|---|
| L-SHAPED PIPE TILE TYPE |  |  |  |  |
| I-SHAPED PIPE TILE TYPE |  |  | | |
| NON-PIPE TILE TYPE |  | | | |

F I G. 2 4
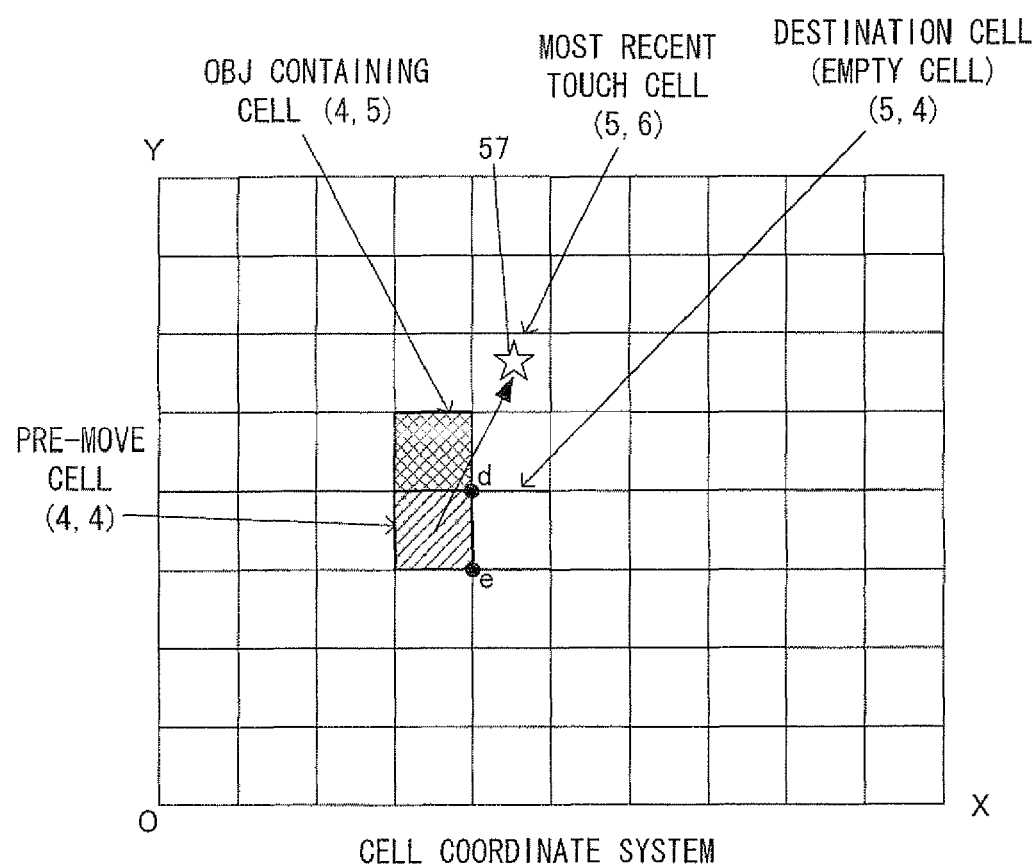

PROGRAM FOR OBJECT MOVEMENT STORED IN A NON-TRANSITORY COMPUTER READABLE STORAGE MEDIUM AND OBJECT MOVEMENT GAME APPARATUS

CROSS REFERENCE TO RELATED APPLICATION

The disclosure of Japanese Patent Application No. 2009-208073, filed Sep. 9, 2009, is incorporated herein by reference.

BACKGROUND OF THE INVENTION

1. Field of the Invention

The present invention relates to a program for object movement stored in a non-transitory computer readable storage medium and an object movement game apparatus. More particularly, the present invention relates to a non-transitory computer readable storage medium and an object movement game apparatus in which an object is moved using a pointing device or the like.

2. Description of the Background Art

Conventionally, as a game in which an object is moved, there is a puzzle game in which an object is moved in virtual game space in which a plurality of objects are displayed, in a manner which allows the object to satisfy a predetermined condition.

For example, Document 1 described below discloses, as a game in which an object is moved, a puzzle game in which paths drawn on tiles are linked one after another to carry a ball to a goal, by moving a tile or rotating an arrangement of four selected tiles using a touch stylus to change the position of the tile or tiles. Document 1: Nintendo, "What kind of game is Touch Panic?," [online], Nintendo DS, [retrieved on Aug. 8, 2009], retrieved from the Internet <URL: www.nintendo.co.jp/ds/ap9j/what/index.html>

Also, Document 2 described below discloses, as a game in which an object is moved, a well-known puzzle game called "Tetris." In this game, pieces having various shapes (commonly called tetrominoes), which automatically fall, are stacked in virtual game space in a manner which allows them to satisfy a predetermined condition, by moving each piece horizontally or rotating it. Document 2: Nintendo, "Rules of Tetris," [online], Nintendo DS, [retrieved on Aug. 8, 2009], retrieved from the Internet <URL: www.nintendo.co.jp/ds/atrj/rule/index.html>

Also, Document 3 described below discloses, as a game in which an object is moved, a puzzle game in which, when numbers placed in virtual game space are moved using a touch stylus, the numbers are flipped over horizontally or vertically, depending on the movement direction. Document 3: Nintendo, "Slip and Move Numbers Using Touch Stylus," [online], Nintendo DS, [retrieved on Aug. 8, 2009], retrieved from the Internet <URL: www.nintendo.co.jp/ds/dsiware/kadj/rule/index.html>

However, in the puzzle game disclosed in Document 1, only the arrangement and positions of a plurality of tiles are changed, depending on the slide direction or the rotational direction, and the form of each tile itself is not changed before or after manipulation. Therefore, the absence of the change of the tiles themselves is likely to cause the game to be monotonous.

In the game "Tetris" disclosed in Document 2, pieces are moved downward and sideways and are rotated. However, in this game, the movement and rotation of each piece are independently performed, resulting in poor unpredictability. Also, the changing pattern of each piece is limited to movement and rotation, i.e., variations of the change of each piece are few, and therefore, the game is likely to be monotonous.

In the game disclosed in Document 3, numbers can be flipped over while they are moved. However, flip-over is the only form of the change, and therefore, the game is likely to be monotonous.

SUMMARY OF THE INVENTION

Therefore, an object of the present invention is to provide a program for object movement stored in a non-transitory computer readable storage medium and an object movement game apparatus in which the form of an object can be changed in various fashions, depending on a condition, when the object is moved, thereby making it possible to provide highly enjoyable games.

The present invention has the following features attain the object mentioned above.

The present invention provides a computer readable storage medium storing an object movement game program for causing a computer of a game apparatus including input means and display means to function as object display control means, move target object setting means, movement direction deciding means, move condition determining means, rotation movement control means, and flip-over movement control means. The object display control means arranges a plurality of objects in a virtual game field, and causes the display means to display an image of the plurality of objects arranged. The move target object setting means sets a move target object which is a target to be moved, from the plurality of objects. The movement direction deciding means decides a movement direction of the set move target object based on an input from the input means. The move condition determining means determines whether or not a rotation movement condition or a flip-over movement condition is satisfied with respect to the movement direction decided by the movement direction deciding means. The rotation movement control means moves the move target object in a rotated form thereof in the movement direction when the move condition determining means determines that the rotation movement condition is satisfied. The flip-over movement control means moves the move target object in a flipped-over form thereof in the movement direction when the move condition determining means determines that the flip-over movement condition is satisfied.

As a result, the move target object can be moved by rotation or flip-over, depending on the condition. Therefore, the form of the move target object can be changed in various manners, whereby a game which enthralls a player can be provided.

Also, in the present invention, the rotation movement condition may be that a single predetermined point on a perimeter facing in the movement direction of the move target object contacts another object. The flip-over movement condition may be that two predetermined points on a perimeter facing in the movement direction of the move target object contact another object.

As a result, when a single predetermined point on a perimeter facing in the movement direction of the move target object contacts another object, the move target object is moved by rotation. When two predetermined points on a perimeter facing in the movement direction of the move target object contact another object, the move target object is moved by flip-over. Therefore, the player can intuitively recognize the movement form of the move target object.

Also, in the present invention, the move target object may have a plurality of vertices. The object movement game program may cause the computer to further function as first positional relationship determining means for determining whether or not two vertices of the move target object are each a move vertex having a predetermined positional relationship with respect to another object. The move condition determining means may determine that the rotation movement condition is satisfied when the first positional relationship determining means determines that one of the two vertices is the move vertex, and may determine that the flip-over movement condition is satisfied when the first positional relationship determining means determines that the two vertices are both the move vertex.

As a result, it is determined whether the move target object is to be moved by rotation or flip-over, depending on whether one or both of the two vertices of the move target object are each the move vertex having the predetermined positional relationship with respect to another object. Therefore, the player can intuitively recognize the movement form of the move target object.

Also, in the present invention, the two vertices of the move target object may be two vertices facing in the movement direction of the move target object.

As a result, the player can intuitively recognize the movement form of the move target object when the move target object is moved in the movement direction.

Also, in the present invention, when the first positional relationship determining means determines that none of the two vertices is the move vertex, the move condition determining means may determine that neither the rotation movement condition nor the flip-over movement condition is satisfied, and the rotation movement control means and the flip-over movement control means both may not move the move target object in the movement direction.

As a result, the direction in which the move target object can be moved is limited, whereby the difficulty level of a game can be increased.

Also, in the present invention, the rotation movement control means may move the move target object in the movement direction by rotation using the move vertex determined by the first positional relationship determining means as a pivot. Also, the flip-over movement control means may move the move target object in the movement direction by flip-over using a line connecting the two move vertices determined by the first positional relationship determining means as a symmetry axis.

Also, in the present invention, the first positional relationship determining means may determine that, of the two vertices of the move target object, a vertex contacting another object is the move vertex.

As a result, the move target object is moved by rotation or flip-over in a manner which seems to obey natural laws. Therefore, the player can intuitively predict the movement form of the move target object, whereby a game which enthralls the player can be provided.

Also, in the present invention, the object movement game program may cause the computer to further function as designated position detecting means for repeatedly detecting a designated position in the virtual game field based on an input from the input means. The movement direction deciding means may decide a movement direction of the move target object based on a change in the designated position.

As a result, the movement direction of the move target object is decided based on a change in the designated position. Therefore, the player can intuitively move the move target object.

Also, in the present invention, the object movement game program may cause the computer to further function as second positional relationship determining means and emphasized vertex display control means. In this case, the second positional relationship determining means determines whether or not each vertex of the move target object is a move vertex contacting another object. Also, the emphasized vertex display control means emphasizes a move vertex determined by the second positional relationship determining means and causing the display means to display the move vertex.

As a result, when the player selects a move target object, a move vertex(s) contacting another object is displayed and emphasized. Therefore, the player, when moving the move target object to a desired position, can predict whether the move target object can be moved by rotation or flip-over. As a result, the operability of the player can be improved.

Also, in the present invention, the object movement game program may cause the computer to further function as movability indication display control means for causing the display means to display an indication indicating that the move target object can be moved, at a position to which the move target object can be next moved.

As a result, the indication is displayed at a position to which the move target object can be moved. Therefore, the player can more easily determine whether the move target object can be moved to a desired position, whereby the operability of the player can be improved.

Also, in the present invention, the movability indication display control means may cause the display means to display an indication of an identifiable state of the move target object which will have been moved in a rotated or flipped-over form thereof, at a position to which the move target object can be next moved.

As a result, the state of the move target object which will have been moved is displayed at a position to which the move target object can be moved. Therefore, the state of the move target object which will have been moved can be visually recognized, whereby the operability of the player can be improved.

Also, in the present invention, the move target object setting means may set the move target object based on an input from the input means.

As a result, the move target object is set in accordance with the player's intention.

Also, in the present invention, the object movement game program may cause the computer to process a puzzle game. The object movement game program may cause the computer to further function as arrangement determining means for determining whether or not an arrangement of the plurality of objects is in a predetermined state. Also, a form of the move target object which will have been moved may vary between when the move target object is moved in a rotated form thereof in the movement direction and when the move target object is moved in a flipped-over form thereof in the movement direction.

As a result, it is possible to provide an advanced puzzle game in which puzzle pieces can be moved in various manners.

Also, in the present invention, the arrangement determining means may determine whether or not a line diagram represented by the plurality of objects is in a game completed state in which a first point and a second point are connected.

As a result, it is necessary to move an objects) by rotation or flip-over so as to connect the line diagram from the first point to the second point, resulting in a more enjoyable game.

The present invention also provides a game apparatus comprising input means, display means, object display control means, move target object setting means, movement direction deciding means, move condition determining means, rotation movement control means, and flip-over movement control means. The object display control means arranges a plurality of objects in a virtual game field, and causes the display means to display an image of the plurality of objects arranged. The move target object setting means sets a move target object which is a target to be moved, from the plurality of objects. The movement direction deciding means decides a movement direction of the set move target object based on an input from the input means. The move condition determining means determines whether or not a rotation movement condition or a flip-over movement condition is satisfied with respect to the movement direction decided by the movement direction deciding means. The rotation movement control means moves the move target object in a rotated form thereof in the movement direction when the move condition determining means determines that the rotation movement condition is satisfied. The flip-over movement control means moves the move target object in a flipped-over form thereof in the movement direction when the move condition determining means determines that the flip-over movement condition is satisfied.

As a result, the move target object can be moved by rotation or flip-over, depending on the condition. Therefore, the form of the move target object can be changed in various manners, whereby a game which enthralls a player can be provided.

According to the present invention, it is possible to provide a highly enjoyable object movement game program and object movement game apparatus in which the form of an object can be changed in various manners, depending on the condition, when the object is moved.

These and other objects, features, aspects and advantages of the present invention will become more apparent from the following detailed description of the present invention when taken in conjunction with the accompanying drawings.

BRIEF DESCRIPTION OF THE DRAWINGS

FIG. 20 is a diagram showing an example of object types and display orientations of the object types;

FIG. 21 is a diagram showing an example of type silhouettes of tiles and display orientations of each type;

FIG. 24 is a diagram for specifically describing an example of the process of step 131 of FIG. 15;

DESCRIPTION OF THE PREFERRED EMBODIMENTS

Figure 1:
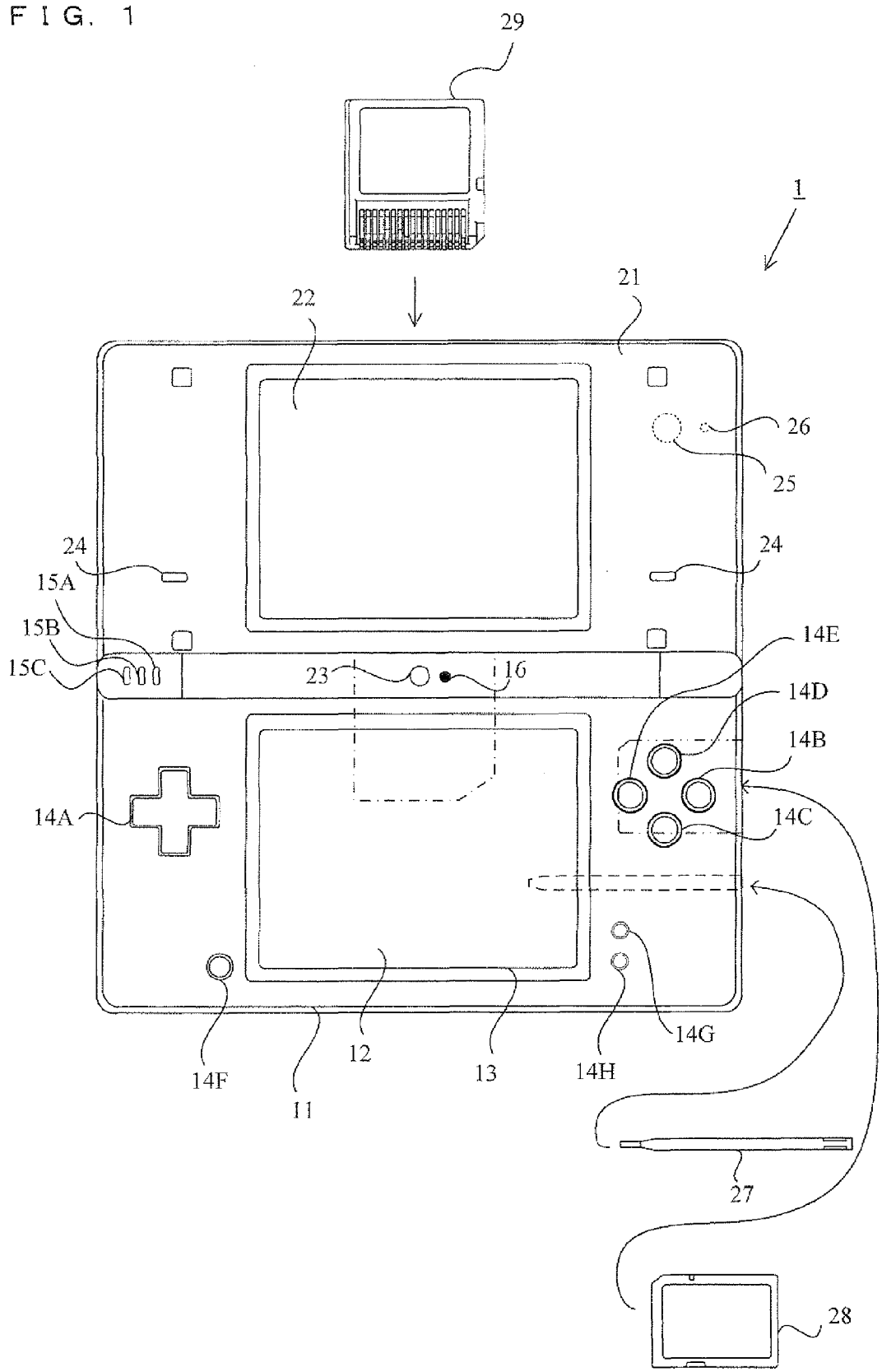
FIG. 1 is an external view of a game apparatus 1 which executes a puzzle game program which is an example of an object movement game program according to the present invention.

An object movement game apparatus for executing an object movement game program according to an embodiment of the present invention will be described hereinafter with reference to the accompanying drawings. In the description which follow, a game apparatus 1 is used as an example of the object movement game apparatus, and a puzzle game which is executed by the game apparatus 1 is used as an example of the object movement game program. Note that FIG. 1 is an external view of the game apparatus 1 which executes a puzzle game program which is an example of the object movement game program of the present invention. Here, as an example of the game apparatus 1, a handheld game apparatus will be described. Note that the game apparatus 1 includes a camera, and also functions as an imaging apparatus which captures an image using the camera, displays the captured image on a screen, and saves data of the captured image.

In FIG. 1, the game apparatus 1, which is a flip-type handheld game apparatus, is shown in an open state. The game apparatus 1 has a size which allows a player to hold it by one or both hands, even when it is in the open state.

The game apparatus 1 has a lower housing 11 and an upper housing 21. The lower housing 11 and the upper housing 21 are linked to each other in a manner which allows them to be opened and closed (foldable). In the example of FIG. 1, the lower housing 11 and the upper housing 21 are each in the shape of a rectangular board which is wider than it is tall, and are rotatably linked at their longer sides. Typically, the player uses the game apparatus 1 in the open state. When the game apparatus 1 is not used, the player leaves the game apparatus 1 in the closed state. Also, in the example of FIG. 1, the game apparatus 1 is not limited to the open and closed states, and can be maintained with the lower housing 11 and the upper housing 21 being in an intermediate state between the open state and the closed state, keeping any angle by friction force occurring at the linking portion. In other words, the upper housing 21 can be caused to remain still at any angle with respect to the lower housing 11.

The lower housing 11 includes a lower LCD (Liquid Crystal Display) 12. The lower LCD 12 is wider than it is tall, and is arranged in a manner which causes a longer side direction thereof matches a longer side direction of the lower housing 11. Although an LCD is employed as the display device included in the game apparatus 1 in this embodiment, any other display devices may be used, including a display device in which EL (Electro Luminescence: electric field light emission) is utilized, and the like. The game apparatus 1 can also employ a display device having any resolution.

Operation buttons 14A to 14K and a touch panel 13 are provided as input devices in the lower housing 11. As shown in FIG. 1, of the operation buttons 14A to 14K, a direction input button 14A, an operation button 14B, an operation button 14C, an operation button 14D, an operation button 14E, a power button 14F, a start button 14G, and a select button 14K, are provided on an inner main surface of the lower housing 11 which is positioned inside the upper housing 21 and the lower housing 11 when the upper housing 21 and the lower housing 11 are closed. The direction input button 14A is used in, for example, a select operation or the like. The operation buttons 14B to 14K are used in, for example, a decide operation, a cancel operation and the like. The power button 14F is used to power ON/OFF the game apparatus 1. In the example of FIG. 1, the direction input button 14A and the power button 14F are provided on the inner main surface of the lower housing 11 on one (the left side in FIG. 1) of the left and right sides of the lower LCD 12 provided in the vicinity of a middle of the inner main surface of the lower housing 11. The operation buttons 14B to 14E, the start button 14G and the select button 14K are provided on the inner main surface of the lower housing 11 on the other side (the right side in FIG. 1) of the left and right sides of the lower LCD 12. The direction input button 14A, the operation buttons 14B to 14E, the start button 14G and the select button 14H are used to perform various operations with respect to the game apparatus 1.

Note that, in FIG. 1, the operation buttons 14I to 14K are not shown. For example, the L-button 14I is provided in a left end portion of an upper surface of the lower housing 11, and the R-button 14J is provided in a right end portion of the upper side surface of the lower housing 11. The L-button 14I and the R-button 14J are used to perform, for example, a shoot command operation (shutter release operation) with respect to the game apparatus 1. Moreover, the sound volume button 14K is provided in a left side surface of the lower housing 11. The sound volume button 14K is used to adjust the sound volume of a loudspeaker included in the game apparatus 1.

The game apparatus 1 also includes a touch panel 13 as an input device in addition to the operation buttons 14A to 14K. The touch panel 13 is attached to the lower LCD 12, covering a screen of the lower LCD 12. Note that, in this embodiment, the touch panel 13 is, for example, a resistive touch panel. Note that the touch panel 13 is not limited to the resistive type, and any pressure touch panels can be used. Also, in this embodiment, for example, the touch panel 13 has the same resolution (detection precision) as that of the lower LCD 12. Note that the resolution of the touch panel 13 does not necessarily need to be equal to the resolution of the lower LCD 12. Also, a slot (indicated by a dashed line in FIG. 1) for a touch stylus 27 is provided in a right side surface of the lower housing 11. The slot can accommodate the touch stylus 27 which is used to perform an operation with respect to the touch panel 13. Although the touch stylus 27 is normally used to enter an input to the touch panel 13, a finger of the player or the like as well as the touch stylus 27 can be used to operate the touch panel 13.

Also, a slot (indicated by a dash-dot-dot-dash line in FIG. 1) for accommodating a memory card 28 is provided in the right side surface of the lower housing 11. A connector (not shown) for electrically connecting the game apparatus 1 and the memory card 28 is provided inside the slot. The memory card 28, which is, for example, an SD (Secure Digital) memory card, is detachably attached to the connector. The memory card 28 is used to, for example, store (save) an image captured by the game apparatus 1 read an image generated by another device into the game apparatus 1, or the like.

Moreover, a slot (indicated by a dash-dot-dash line in FIG. 1) for accommodating a memory card 29 is provided in the upper side surface of the lower housing 11. Also inside the slot, a connector (not shown) for electrically connecting the game apparatus 1 and the memory card 29 is provided. The memory card 29, which is a storage medium which stores an information processing program, a game program or the like, is detachably attached to the slot provided in the lower housing 11.

Three LEDs 15A to 15C are attached to a left side portion of the linking portion of the lower housing 11 and the upper housing 21. Here, the game apparatus 1 can wirelessly communicate with another apparatus. The first LED 15A is ON during a time period that wireless communication is established. The second LED 15B is ON during a time period that the game apparatus 1 is charged. The third LED 15C is ON during a time period that the game apparatus 1 is powered ON. Therefore, the three LEDs 15A to 15C can notify the player of the communication establishment status, the charging status and the power ON/OFF status of the game apparatus 1.

On the other hand, the upper housing 21 includes an upper LCD 22. The upper LCD 22 is wider than it is tall, and is arranged in a manner which allows a longer side direction thereof matches a longer side direction of the upper housing 21. Note that, as is similar to the lower LCD 12, a display device having any other technology and any other resolution may be employed instead of the upper LCD 22. Moreover, a touch panel may be provided, covering the upper LCD 22.

Moreover, two camera (an inner camera 23 and an outer camera 25) are provided in the upper housing 21. As shown in FIG. 1, the inner camera 23 is attached to the inner main surface in the vicinity of the linking portion of the upper housing 21. On the other hand, the outer camera 25 is attached to a surface opposite to the inner main surface to which the inner camera 23 is attached, i.e., an outer main surface of the upper housing 21 (a back surface of the upper housing 21 shown in FIG. 1, which is positioned outside when the game apparatus 1 is in the closed state). Note that, in FIG. 1, the outer camera 25 is indicated by a dashed line. As a result, the inner camera 23 can capture an image in a direction in which the inner main surface of the upper housing 21 faces, and the outer camera 25 can capture an image in a direction opposite to the shooting direction of the inner camera 23, i.e., a direction in which the outer main surface of the upper housing 21 faces. Thus, in this embodiment, the two cameras, i.e., the inner camera 23 and the outer camera 25, are arranged in a manner which allows their shooting directions to be opposite to each other. For example, while the player can capture an image of a scene as viewed from the game apparatus 1 toward the player using the inner camera 23, and the outer camera 25 can capture an image of a scene as viewed from the game apparatus 1 in a direction opposite to the direction toward the player. Note that the lower LCD 12 and/or the upper LCD 22 may also be used to display an image captured by the inner camera 23 or the outer camera 25 in real time.

Note that a microphone (a microphone 43 shown in FIG. 2) is accommodated as a voice input device in the inner main surface in the vicinity of the linking portion. In addition, a microphone hole 16 which allows the microphone 43 to sense a sound outside the game apparatus 1, is formed in the inner main surface in the vicinity of the linking portion. The position where the microphone 43 is accommodated and the position of the microphone hole 16 do not necessarily need to be positioned at the linking portion. Alternatively, for example, the microphone 43 may be accommodated in the lower housing 11 while the microphone hole 16 may be provided in the lower housing 11, corresponding to the position where the microphone 43 is accommodated.

Moreover, a fourth LED 26 (indicated by a dashed line in FIG. 1) is attached to the outer main surface of the upper housing 21. The fourth LED 26 is ON during a time period that the inner camera 23 or the outer camera 25 captures an image. The fourth LED 26 may also flicker during a time period that the inner camera 23 or the outer camera 25 captures a moving image (stores captured images as a moving image). Note that the fourth LED 26 may be OFF during a time from when the shutter release is pressed to when an image captured at the moment when the shutter release is pressed is completely stored, so as to prevent the LED to be reflected on the screen. The fourth LED 26 can be used to notify a subject or a person around that the game apparatus 1 is shooting the subject.

Moreover, sound holes 24 are formed in the main surface on both left and right sides of the upper LCD 22 provided in the vicinity of the middle of the inner main surface of the upper housing 21. Loudspeakers are accommodated in the upper housing 21 behind the respective sound holes 24. The sound holes 24 are used to emit sounds from the loudspeakers to the outside of the game apparatus 1.

As described above, the upper housing 21 includes the inner camera 23 and the outer camera 25 for capturing images, and the upper LCD 22 which is a means for displaying various images. On the other hand, the lower housing 11 includes input devices (the touch panel 13 and the buttons 14A to 14K) for entering operational inputs to the game apparatus 1, and the lower LCD 12 which is a means for displaying various images. The input devices are used in, for example, an application in which, when the game apparatus 1 is used, the player holding the lower housing 11 is allowed to enter inputs to the input devices while a captured image (an image captured by a camera) is displayed on the lower LCD 12 or the upper LCD 22.

Next, an internal configuration of the game apparatus 1 will be described with reference to FIG. 2. Note that FIG. 2 is a block diagram showing an example of the internal configuration of the game apparatus 1.

Figure 2:
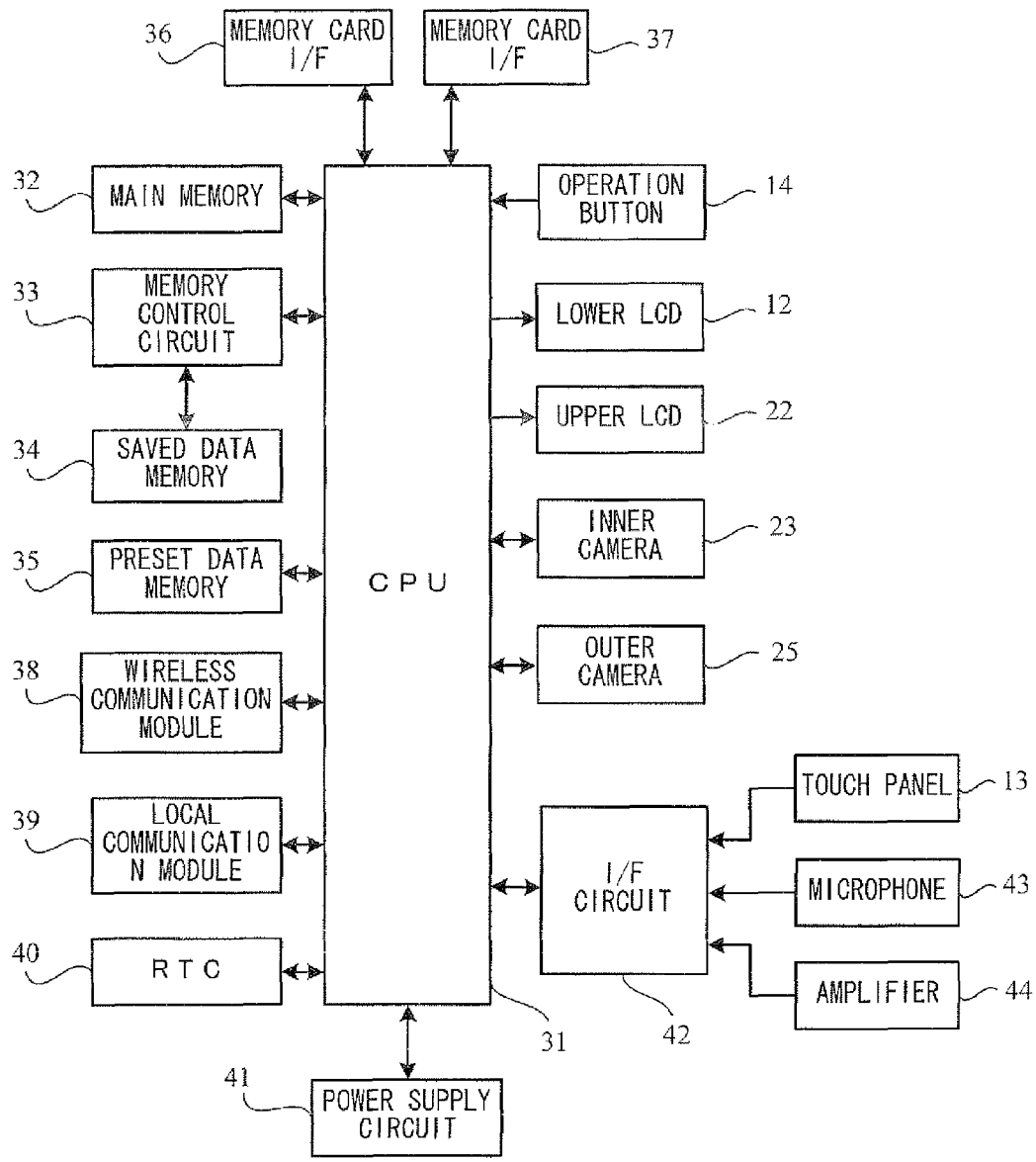
FIG. 2 is a block diagram showing an example of an internal configuration of the game apparatus 1.

In FIG. 2, the game apparatus 1 includes electronic parts, such as a CPU 31, a main memory 32, a memory control circuit 33, a saved data memory 34, a preset data memory 35, memory card interfaces (memory card I/Fs) 36 and 37, a wireless communication module 38, a local communication module 39, a real-time clock (RTC) 40, a power supply circuit 41, an interface circuit (I/F circuit) 42 and the like. These electronic parts are mounted on an electronic circuit board, which is accommodated in the lower housing 11 (or the upper housing 21).

The CPU 31 is an information processing means for executing a predetermined program. In this embodiment, the predetermined program is stored in a memory (e.g., the saved data memory 34) provided in the game apparatus 1 or the memory cards and/or 29. The CPU 31 executes an information process described below by executing the predetermined program. Note that the program to be executed by the CPU 31 may be previously stored in the memory provided in the game apparatus 1 or may be obtained from the memory cards 28 and/or 29, or alternatively, may be obtained from another apparatus by communication with the apparatus.

The main memory 32, the memory control circuit 33 and the preset data memory 35 are connected to the CPU 31. Also, the saved data memory 34 is connected to the memory control circuit 33. The main memory 32 is a storage means which is used as a work area or a buffer area for the CPU 31. Specifically, the main memory 32 stores various pieces of data which are used in the information process, or a program obtained from the outside (the memory cards 28 and 29 or other apparatuses, etc.). In this embodiment, for example, a PSRAM (Pseudo-SRAM) is employed as the main memory 32. The saved data memory 34 is a storage means for storing a program to be executed by the CPU 31, data of images captured by the inner camera 23 and the outer camera 25, and the like. The saved data memory 34 includes a non-volatile storage medium (e.g., a NAND flash memory in this example). The memory control circuit 33 controls a read operation and a write operation of data with respect to the saved data memory 34 in accordance with a command from the CPU 31. The preset data memory 35 is a storage means for storing data (preset data), such as various parameters previously set in the game apparatus 1 or the like. The preset data memory 35 can be a flash memory which is connected to the CPU 31 via an SPI (Serial Peripheral Interface) bus.

The memory card I/Fs 36 and 37 are each connected to the CPU 31. The memory card 36 performs a read operation and a write operation of data with respect to the memory card 28 attached to the connector in accordance with a command from the CPU 31. Also, the memory card I/F 37 performs a read operation and a write operation of data with respect to the memory card 29 attached to the connector in accordance with a command from the CPU 31. In this embodiment, for example, various programs stored in the memory card 29 are read out and executed by the CPU 31.

Note that the object movement game program of the present invention (hereinafter also simply referred to as the game program of the present invention) is supplied to the computer system not only via the memory card 29, but also via an external storage medium, such as the memory card 28 or the like. Also, the game program of the present invention may be supplied to the computer system via a wired or wireless communication line. Moreover, the game program of the present invention may be previously stored in a non-volatile storage device provided in the computer system. Note that an information storing medium storing the game program of the present invention is not limited to the aforementioned non-volatile storage device, and may be a CD-ROM, a DVD, or other optical disc-shaped media similar to these.

The wireless communication module 38 has a function of connecting to a wireless LAN using a method conforming to, for example, the IEEE 802.11.b/g standard. Also, the local communication module 39 has a function of performing wireless communication with a game apparatus of the same type using a predetermined communication method. The wireless communication module 38 and the local communication module 39 are connected to the CPU 31. The CPU 31 can transmit and receive data to and from another apparatus via the Internet using the wireless communication module 38, and can transmit and receive data to and from another game apparatus of the same type using the local communication module 39.

Also, the RTC 40 and the power supply circuit 41 are connected to the CPU 31. The RTC 40 measures a time period by counting the number of clocks and outputs the time period to the CPU 31. For example, the CPU 31 can also calculate a current time (date) or the like based on the time period measured by the RTC 40. The power supply circuit 41 controls power supplied from a power supply (typically, a battery, accommodated in the lower housing 11) possessed by the game apparatus 1, and supplies the power to each part of the game apparatus 1.

The game apparatus 1 also includes the microphone 43 and an amplifier 44. The microphone 43 and the amplifier 44 are connected to the I/F circuit 42. The microphone 43 senses a voice which the player utters toward the game apparatus 1, and outputs an audio signal indicating the voice to the I/F circuit 42. The amplifier 44 amplifies the audio signal from the I/F circuit 42 and outputs the resultant signal through the loudspeakers (not shown). The I/F circuit 42 is connected to the CPU 31.

Also, the touch panel 13 is connected to the I/F circuit 42. The I/F circuit 42 includes an audio control circuit which controls the microphone 43 and the amplifier 44 (loudspeakers), and a touch panel control circuit which controls the touch panel 13. The audio control circuit performs A/D conversion and D/A conversion with respect to an audio signal, or converts an audio signal into audio data in a predetermined format. The touch panel control circuit generates touch position data in a predetermined format based on a signal from the touch panel 13, and outputs the touch position data to the CPU 31. For example, the touch position data is data which indicates coordinates of a position where an input is entered to an input surface of the touch panel 13. Note that the touch panel control circuit performs reading of a signal from the touch panel 13 and generation of the touch position data once per predetermined time period. The CPU 31 obtains the touch position data via the I/F circuit 42 to find out a position where an input is entered to the touch panel 13.

An operation button 14 includes the operation buttons 14A to 14K, and is connected to the CPU 31. The operation button 14 outputs to the CPU 31 operation data indicating an input status of each of the operation buttons 14A to 14K (whether or not each button has been pressed). The CPU 31 obtains operation data from the operation button 14 and executes a process corresponding to an input which has been entered to the operation button 14.

The inner camera 23 and the outer camera 25 are each connected to the CPU 31. The inner camera 23 and the outer camera 25 capture images in accordance with a command from the CPU 31, and, output captured image data to the CPU 31. For example, the CPU 31 instructs one of the inner camera 23 and the outer camera 25 to capture an image, and the instructed camera captures an image and transmits image data to the CPU 31.

Also, the lower LCD 12 and the upper LCD 22 are each connected to the CPU 31. The lower LCD 12 and the upper LCD 22 each display an image in accordance with a command from the CPU 31. As an example, the CPU 31 causes the lower LCD 12 and/or the upper LCD 22 to display an image (e.g., a game image) generated by executing the game program of the present invention. As another example, the CPU 31 causes one of the lower LCD 12 and the upper LCD 22 to display an image obtained from one of the inner camera 23 and the outer camera 25, and causes the other of the lower LCD 12 and the upper LCD 22 to display an operation explaining screen generated by a predetermined process.

Figure 3:
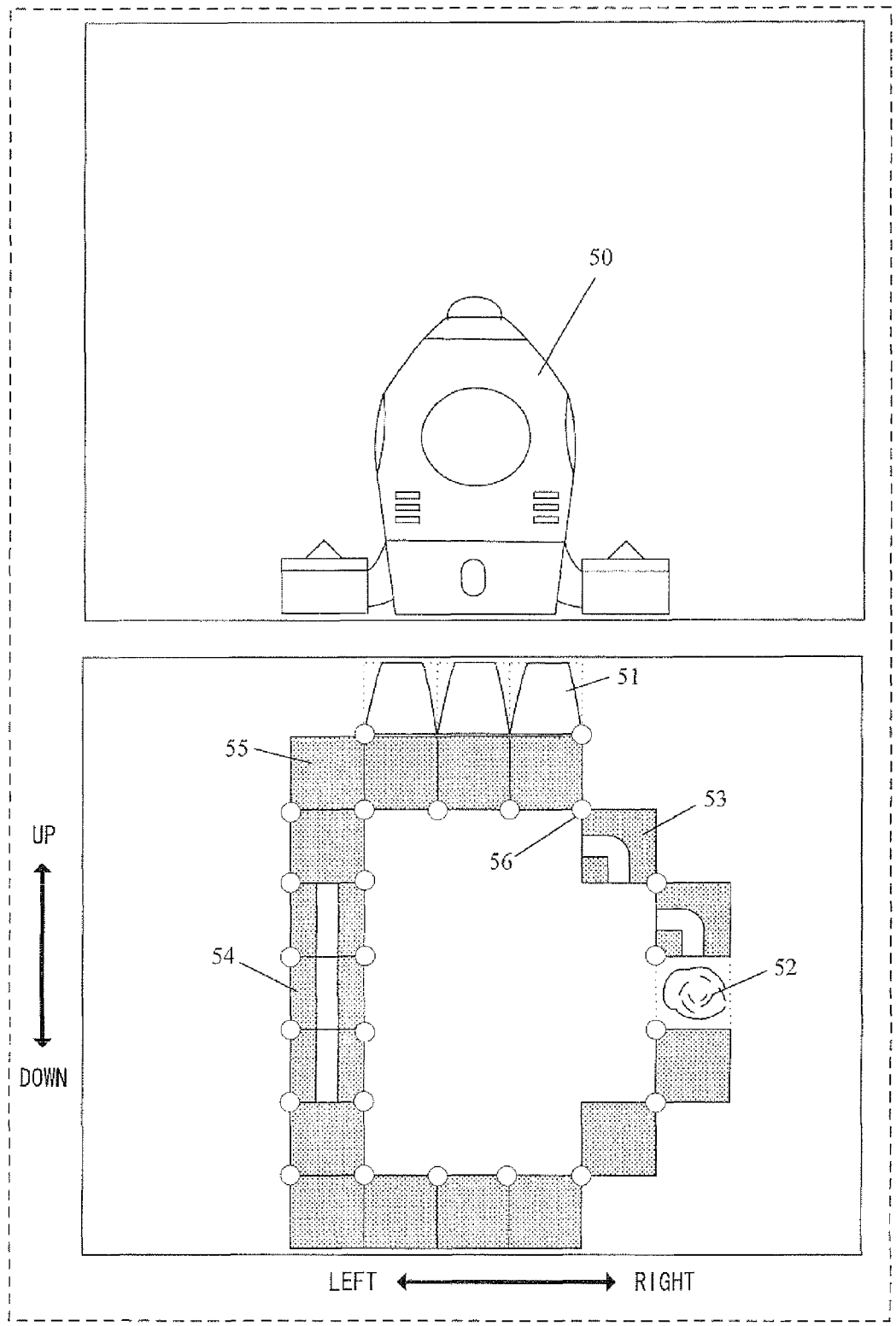
FIG. 3 is a diagram showing an example of images displayed on an upper LCD 22 and a lower LCD 12 during the start of playing of a puzzle game provided by the present invention.
Figure 10:
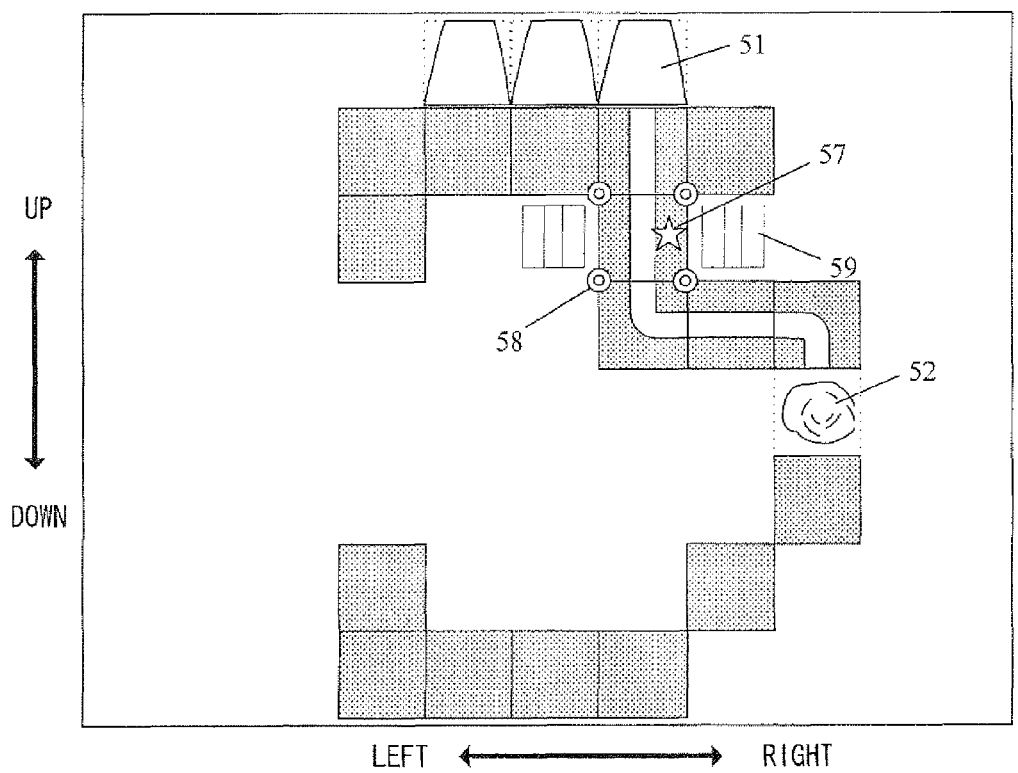
FIG. 10 is a diagram showing an example of a state of puzzle pieces in which a stage is complete in the puzzle game provided by the present invention.
Figure 11:
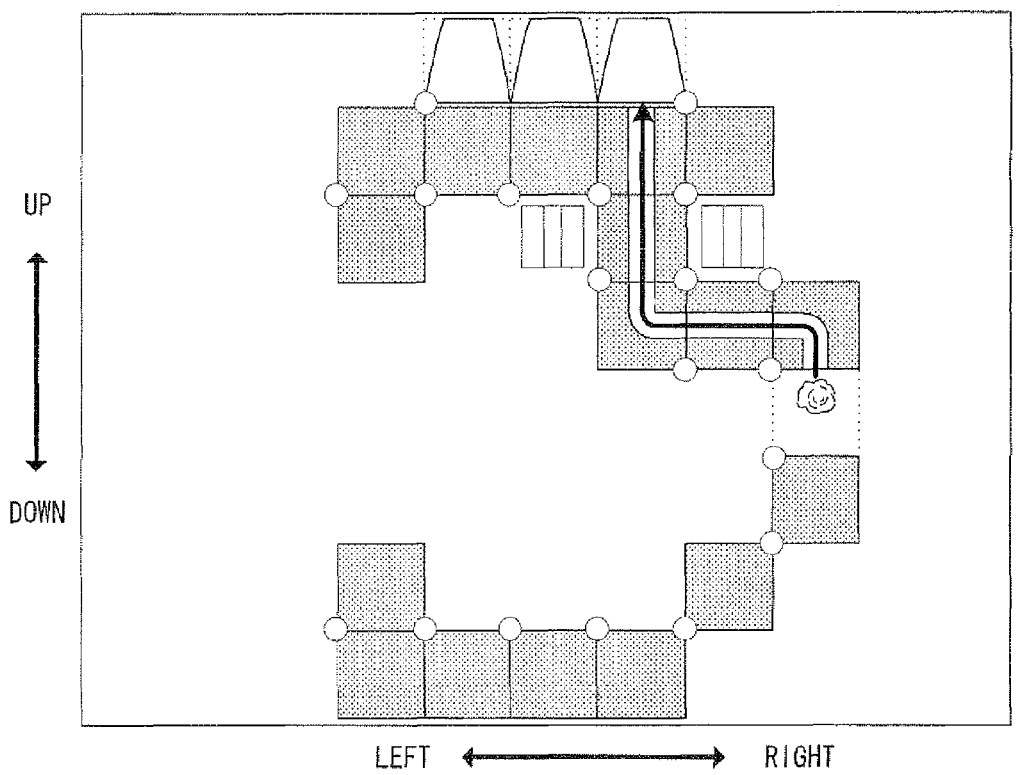
FIG. 11 is a diagram for describing an example of an image displayed on the lower LCD 12 after puzzle pieces are in a game stage completed state in the puzzle game provided by the present invention.
Figure 12:
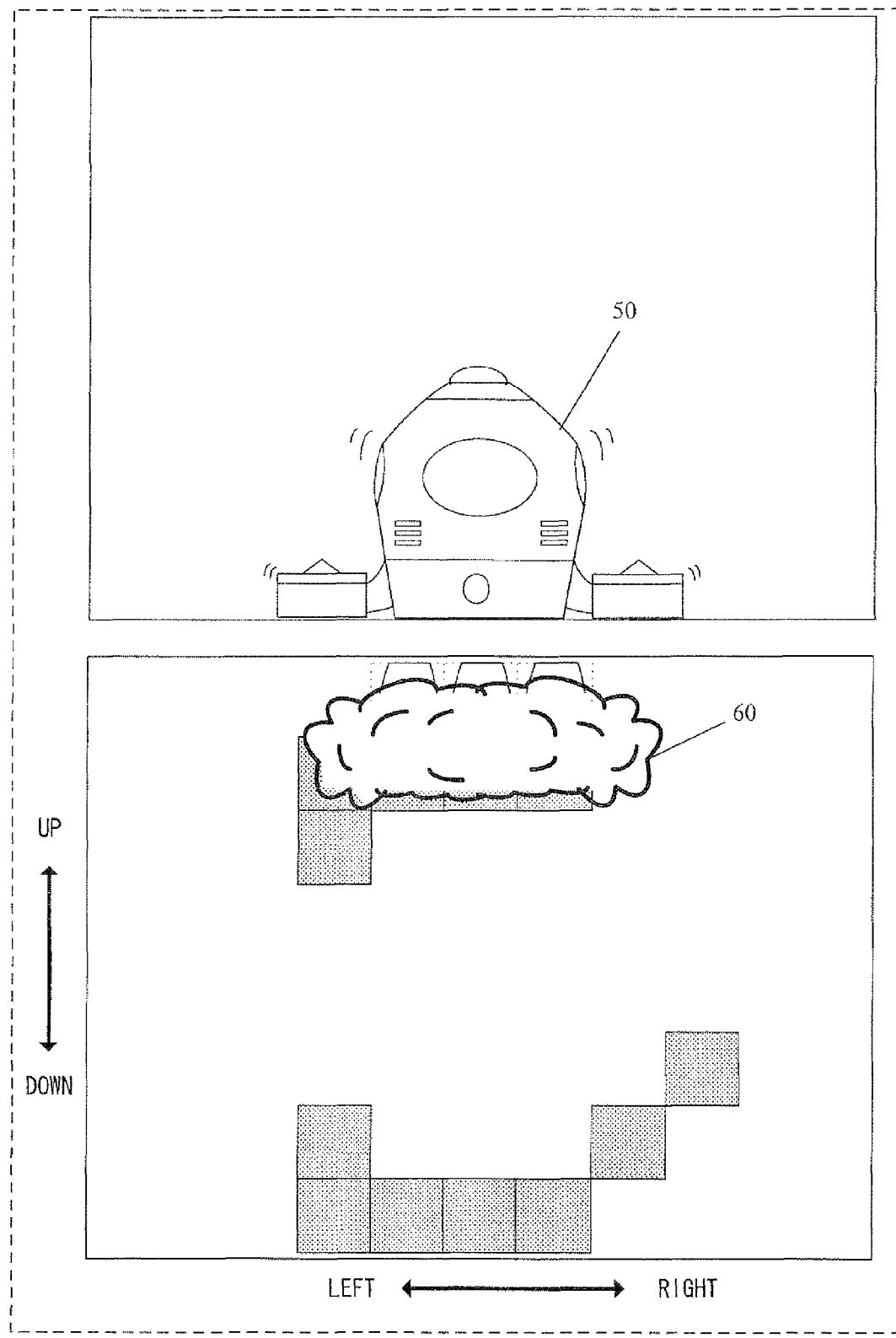
FIG. 12 is a diagram for describing an example of images displayed on the upper and lower LCDs 22 and 12 after puzzle pieces are in a game stage completed state in the puzzle game provided by the present invention.

Next, an outline of an example of a puzzle game which is performed by the game apparatus 1 executing the game program of the present invention (hereinafter referred to as this puzzle game) will be described with reference to FIGS. 3 to 12. FIG. 3 is a diagram showing an example of images displayed on the upper LCD 22 and the lower LCD 12 during the start of playing of this puzzle game. FIGS. 4 to 9 are diagrams for describing an example of forms of movement of a puzzle piece (object) in this puzzle game. FIG. 10 is a diagram showing an example of a state of puzzle pieces in which a stage is complete in this puzzle game. FIGS. 11 and 12 are diagrams for describing an example of images of puzzle pieces displayed on the upper LCD 22 and the lower LCD 12 after a stage is complete in this puzzle game. Note that FIGS. 4 to 9 show only images displayed on the lower LCD 12, but not images displayed on the upper LCD 22. Also, in FIGS. 3 to 12, horizontal and vertical directions are indicated for the sake of convenience.

As shown in FIG. 3, during the start of playing of this puzzle game, a rocket 50 is displayed on the upper LCD 22, and a plurality of objects are displayed on the lower LCD 12. The objects displayed on the lower LCD 12 include objects (hereinafter referred to as nozzle OBJs) 51 each representing a propelling nozzle which is a part of the rocket 50, an object (hereinafter referred to as an energy OBJ) 52 representing energy which is used to cause the rocket 50 to fly, and objects 53 to 55 which are each in the shape of a tile (plate). The objects 53 each have an L-shaped pipe, the objects 54 each have an I-shaped pipe, and the objects 55 each do not have a pipe. The nozzle OBJs 51 and the energy OBJ 52 are objects which cannot be moved, and the objects 53 to 55 are objects which can be moved. In the description which follows, the objects 53 are also referred to as L-shaped pipe tiles 53, the objects 54 are also referred to as I-shaped pipe tiles 54, and the objects 55 are also referred to as non-pipe tiles 55. Also, each object is of one of two types. The positions of the L-shaped pipe tiles 53, the I-shaped pipe tiles 54 and the non-pipe tiles 55 can be changed by user's manipulation, i.e., these are movable objects. As used herein, a movable object is referred to as a "tile." In contrast to this, the positions of the nozzle OBJs 51 and the energy OBJ 52 cannot be changed by user's manipulation, i.e., these are immovable objects. Note that the L-shaped pipes possessed by the L-shaped pipe tiles 53 and the I-shaped pipes possessed by the I-shaped pipe tiles 54 are used to guide the energy OBJ 52 to a nozzle OBJ 51. The objects 51 to 55 are in the shape of a square having an equal size, and are placed in a manner which allows each object to fit into any of square cells arranged in a matrix which will be described later with reference to FIG. 19 (these cells are not displayed on the lower LCD 12). Here, the energy OBJ 52 is a transparent square plate on which an image representing energy is drawn, and the nozzle OBJs 51 are each a transparent square plate on which an image representing a propelling nozzle is drawn. Therefore, the perimeters of the energy OBJ 52 and the nozzle OBJs 51 are indicated by dashed lines in FIGS. 3 to 11. Note that open circles 56 of FIG. 3 are marks each of which indicates a vertex of a cell which satisfies a predetermined condition, and enables the player to predict a movement form (rotation movement or flip-over movement) of a tile. As will be seen later, the predetermined condition is that a vertex of a cell in which a tile is present contacts another cell in which another object (including a tile) is present, and no object is present in a cell adjacent to the tile in a direction in which the tile is to be moved using the vertex as a pivot of rotation movement or a symmetry axis of flip-over movement.

Figure 4:
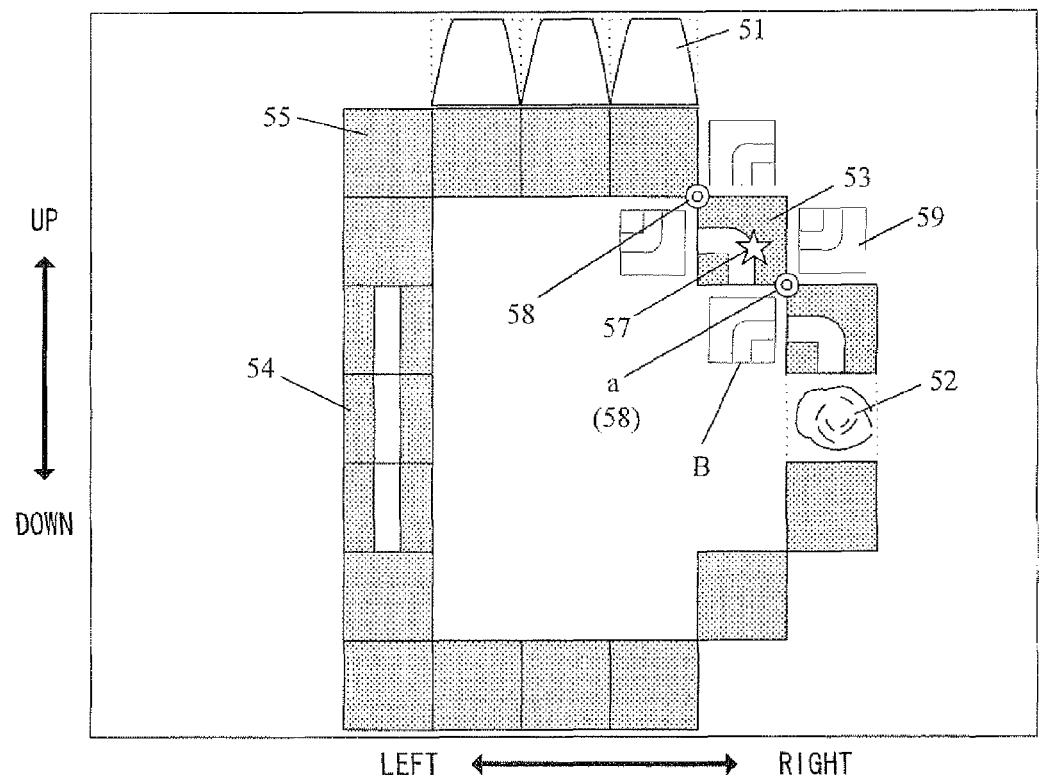
FIG. 4 is a diagram showing an example of how a puzzle piece (movable object) is moved in the puzzle game provided by the present invention.

FIG. 4 shows an example of a state in which a tile (L-shaped pipe tile 53) is designated as a tile to be moved (hereinafter referred to as a move target tile) using the touch stylus 27 or the like. As shown in FIG. 4, a touch pointer 57 is displayed at a position touched by the touch stylus 27 or the like, and a tile on which the touch pointer 57 is placed is designated as a move target tile. Note that, in FIG. 4, as an example, an L-shaped pipe tile 53 on which the touch pointer 57 is placed is designated as a move target tile. Also, the touch pointer 57 is represented by a mark like a star as an example. As shown in FIG. 4, the L-shaped pipe tile 53 designated as a move target tile, which will have been moved to each of cells vertically and horizontally adjacent thereto, is indicated by a silhouette 59. Here, as will be described later, when the L-shaped pipe tile 53 is moved upward or leftward, the L-shaped pipe tile 53 is moved by rotation using the upper left vertex thereof as a pivot. Therefore, the L-shaped pipe tile 53 which will have been rotated is displayed as silhouettes 59 in the upper and left cells. Similarly, when the L-shaped pipe tile 53 is moved downward or rightward, the L-shaped pipe tile 53 is moved by rotation using the lower right vertex thereof as a pivot. Therefore, the L-shaped pipe tile 53 which will have been rotated is displayed as silhouettes 59 in the lower and right cells. Note that a move target tile can be moved to cells vertically and horizontally adjacent thereto, and cannot be moved directly to cells diagonally adjacent thereto. Also, a move target tile cannot be moved to a cell vertically or horizontally adjacent thereto if an object is present in the cell. Also, a silhouette 59 is displayed in only a cell(s) to which a move target tile can be moved, of all adjacent cells. Also, an open circle(s) 56 displayed for a cell in which a move target tile is placed (see FIG. 3) is further emphasized as a double circle 58, and the other open circles 56 are hidden.

Figure 5:
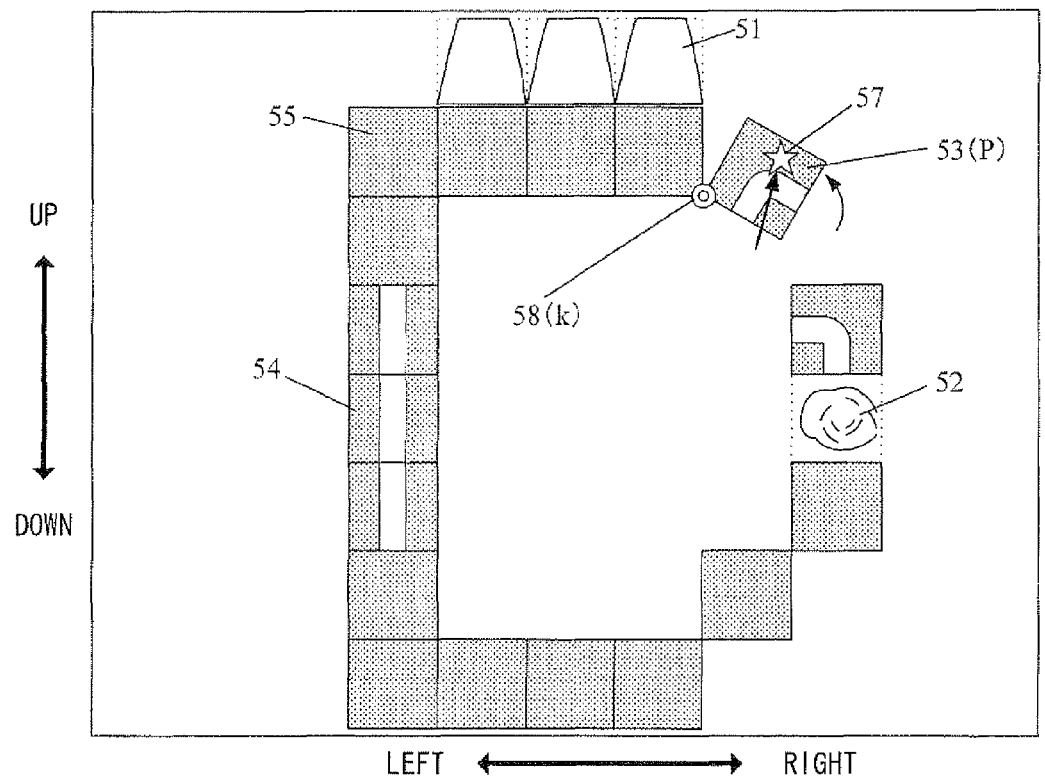
FIG. 5 is a diagram showing an example of how a puzzle piece (movable object) is moved in the puzzle game provided by the present invention.

FIG. 5 shows, as an example, how the L-shaped pipe tile 53 which is the move target tile of FIG. 4 is moved upward. As shown in FIG. 5, when the player moves (drags) the touch painter 57 from the L-shaped pipe tile 53 which is the move target tile to a cell above and adjacent thereto, the L-shaped pipe tile 53 is moved to the above-adjacent cell by rotation using the upper left vertex emphasized by a double circle 58 as a pivot. As will be described in detail later, when one of two vertices of a move target tile which face in a direction (any of the upward, downward, leftward and rightward directions) in which the move target tile is moved, is emphasized by a double circle 58, the move target tile is moved by rotation using the vertex emphasized by the double circle 58 as a pivot.

Figure 6:
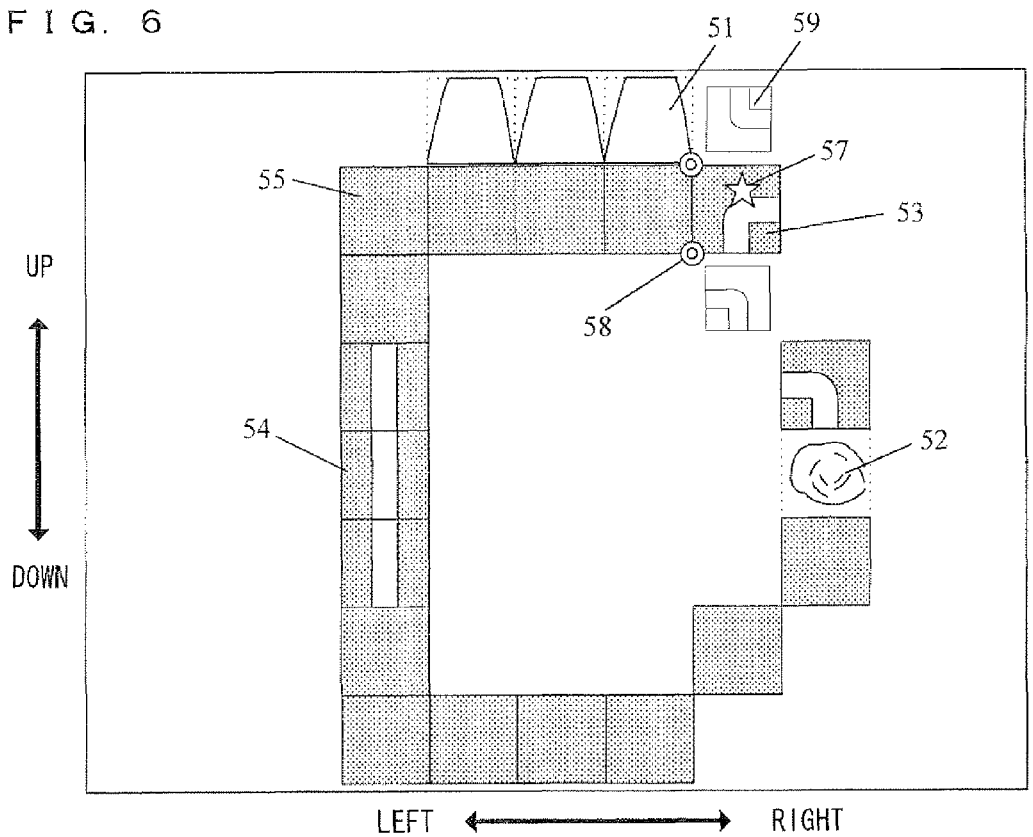
FIG. 6 is a diagram showing an example of how a puzzle piece (movable object) is moved in the puzzle game provided by the present invention.

FIG. 6 shows a state of the L-shaped pipe tile 53 which is the move target tile of FIG. 5 and whose rotation movement has been completed. In FIG. 6, after the movement, the L-shaped pipe tile 53 still remains designated as a move target tile, and therefore, silhouettes 59 and double circles 58 are updated and still displayed with reference to the moved L-shaped pipe tile 53. Although it has been assumed above as an example that an L-shaped pipe tile 53 is moved by rotation, an I-shaped pipe tile 54 and a non-pipe tile 55 can be moved by rotation in a similar manner.

Figure 7:
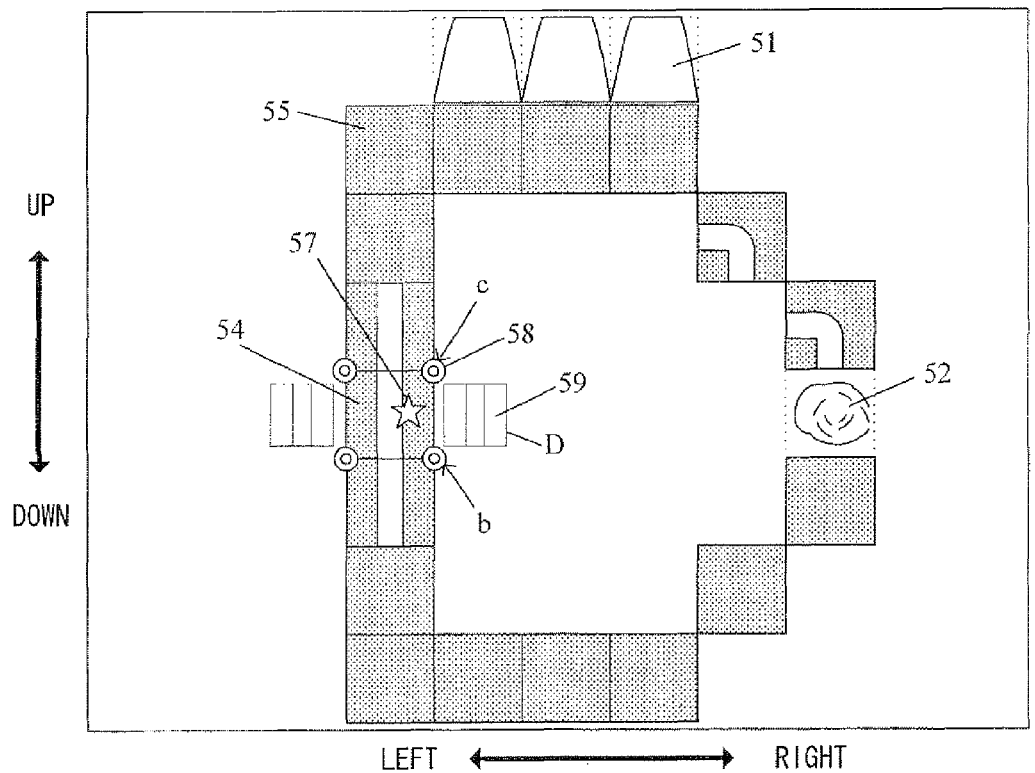
FIG. 7 is a diagram showing an example of how a puzzle piece (movable object) is moved in the puzzle game provided by the present invention.

FIG. 7 shows an example of a state in which a tile (I-shaped pipe tile 54) is designated as a move target tile using the touch stylus 27 or the like. As shown in FIG. 7, a touch pointer 57 is displayed at a position which is touched by the touch stylus 27 or the like, the I-shaped pipe tile 54 on which the touch pointer 57 is placed is designated as a move target tile. Also, as shown in FIG. 7, silhouettes 59 of the I-shaped pipe tile 54 which will have been moved are displayed in cells horizontally adjacent to the I-shaped pipe tile 54 which is the move target tile. Here, as will be described later, when the I-shaped pipe tile 54 is moved leftward, the T-shaped pipe tile 54 is moved by flip-over using a line connecting the upper left vertex and the lower left vertex thereof as a symmetry axis. Therefore, a silhouette 59 indicating the flipped-over state of the I-shaped pipe tile 54 is displayed on the left side. Similarly, when the I-shaped pipe tile 54 is moved rightward, the I-shaped pipe tile 54 is moved by flip-over using a line connecting the upper right vertex and the lower right vertex thereof as a symmetry axis. Therefore, a silhouette 59 indicating the flipped-over state of the I-shaped pipe tile 54 is displayed on the right side. Note that the silhouettes 59 indicating the I-shaped pipe tile 54 which will have been moved are displayed only on the left and right cells to which the I-shaped pipe tile 54 can be directly moved, of the upper, lower, left and right cells to which the I-shaped pipe tile 54 which is the move target tile is adjacent. Also, the open circles 56 (see FIG. 3) which were displayed at the vertices of the cell in which the I-shaped pipe tile 54 (move target tile) is placed, are further emphasized by double circles 58, and the other open circles 56 are hidden.

Figure 8:
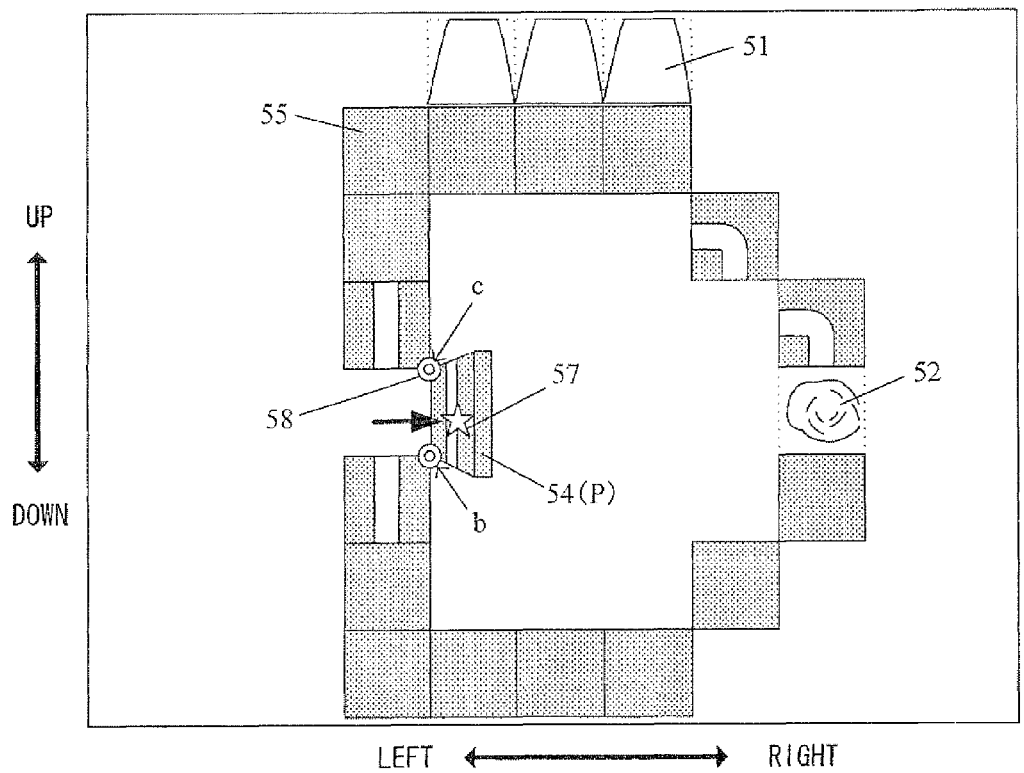
FIG. 8 is a diagram showing an example of how a puzzle piece (movable object) is moved in the puzzle game provided by the present invention.

FIG. 8 shows how the I-shaped pipe tile 54 which is the move target tile described in FIG. 7 and on which the touch pointer 57 is placed, is moved rightward. As shown in FIG. 8, when the player moves (drags) the touch pointer 57 from the I-shaped pipe tile 54 which is the move target tile to a cell which is right-adjacent thereto, the I-shaped pipe tile 54 is moved by flip-over using a line connecting the upper right vertex c and the lower right vertex b emphasized by double circles 58 as a symmetry axis. As will be described in detail later, when two vertices of a move target tile which face in a direction in which the move target tile is moved (any of the upward, downward, leftward and rightward directions) are emphasized by double circles 58, the move target tile is moved by flip-over using a line connecting the two vertices emphasized by the double circles 58 as a symmetry axis.

Figure 9:
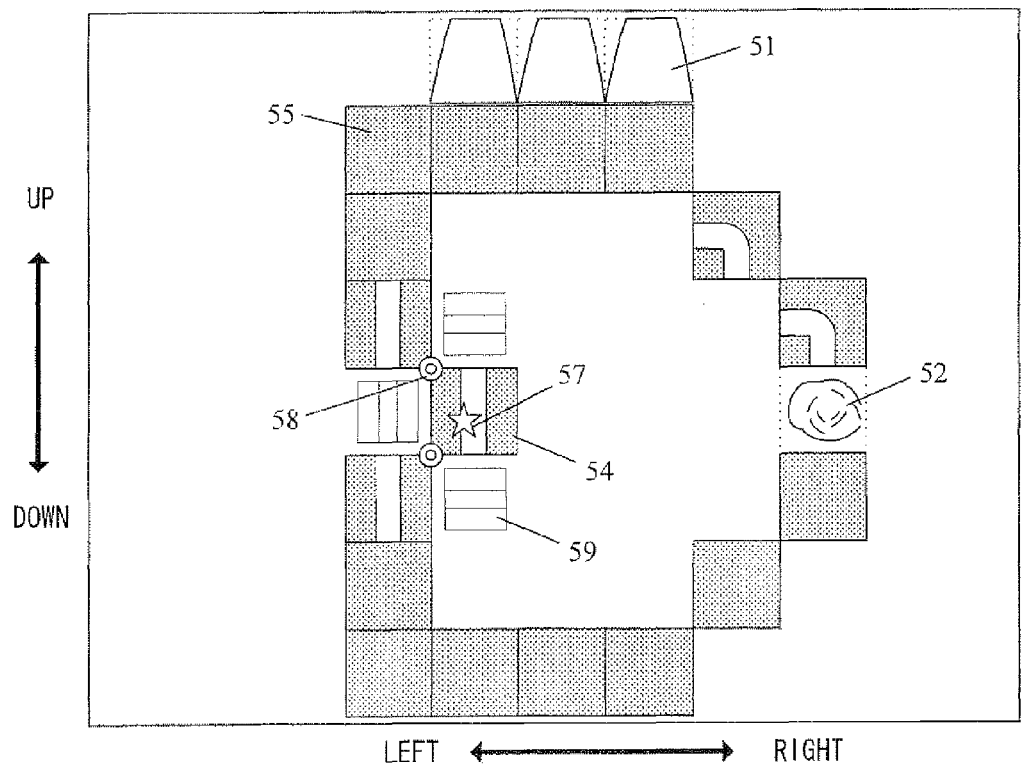
FIG. 9 is a diagram showing an example of how a puzzle piece (movable object) is moved in the puzzle game provided by the present invention.

FIG. 9 is a state of the I-shaped pipe tile 54 which is the move target tile of FIG. 8 and whose flip-over movement has been completed. In FIG. 9, after the movement, the I-shaped pipe tile 54 still remains designated as a move target tile, and therefore, silhouettes 59 and double circles 58 are updated and still displayed with reference to the moved I-shaped pipe tile 54. Although it has been assumed above as an example that an I-shaped pipe tile 54 is moved by flip-over, an L-shaped pipe tile 53 and a non-pipe tile 55 can be moved by flip-over in a similar manner.

FIG. 10 shows an example of a state in which a stage is complete, where the energy OBJ 52 is linked to a nozzle OBJ 51 via pipes possessed by tiles by performing the rotation movement described in FIGS. 4 to 6 and the flip-over movement of FIGS. 7 to 9. Thus, this puzzle game is a game in which tiles are moved so that the energy OBJ 52 is linked to a nozzle OBJ 51 via pipes possessed by the tiles. In addition, after the energy OBJ 52 is linked to a nozzle OBJ 51, energy is injected to the rocket 50 via the pipes as shown in FIG. 11 (see an arrow), so that the rocket 50 is launched by expelling exhaust 60 from the nozzle OBJ 51 as shown in FIG. 12, and the game goes to the next stage. Note that, as shown in FIG. 12, after energy is passed, the L-shaped pipe tiles 53 and the I-shaped pipe tiles 54 are hidden.

Figure 13:
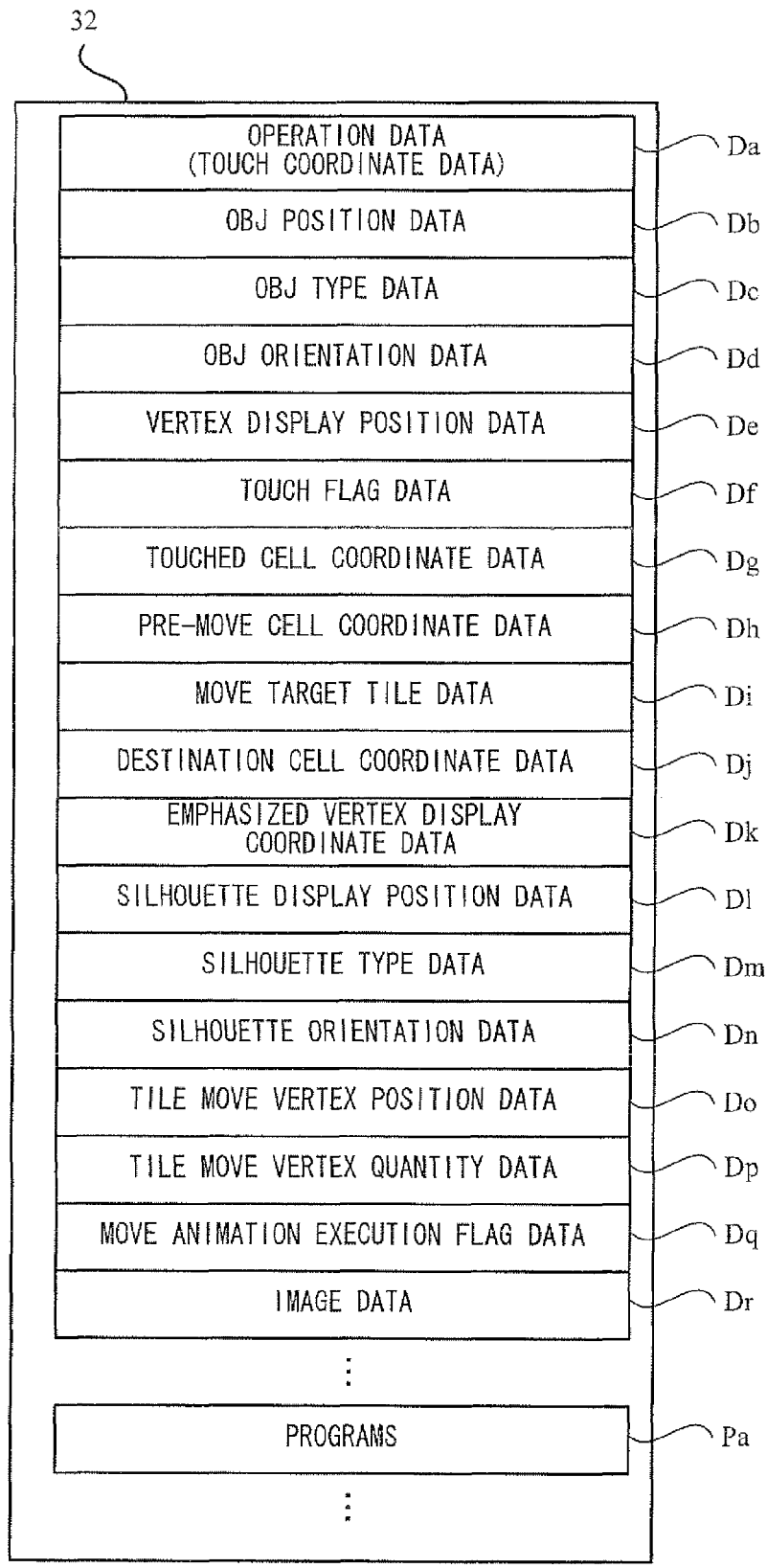
FIG. 13 is a diagram showing an example of various pieces of data which are stored in a main memory 32, depending on execution of the game program of the present invention.
Figure 14:
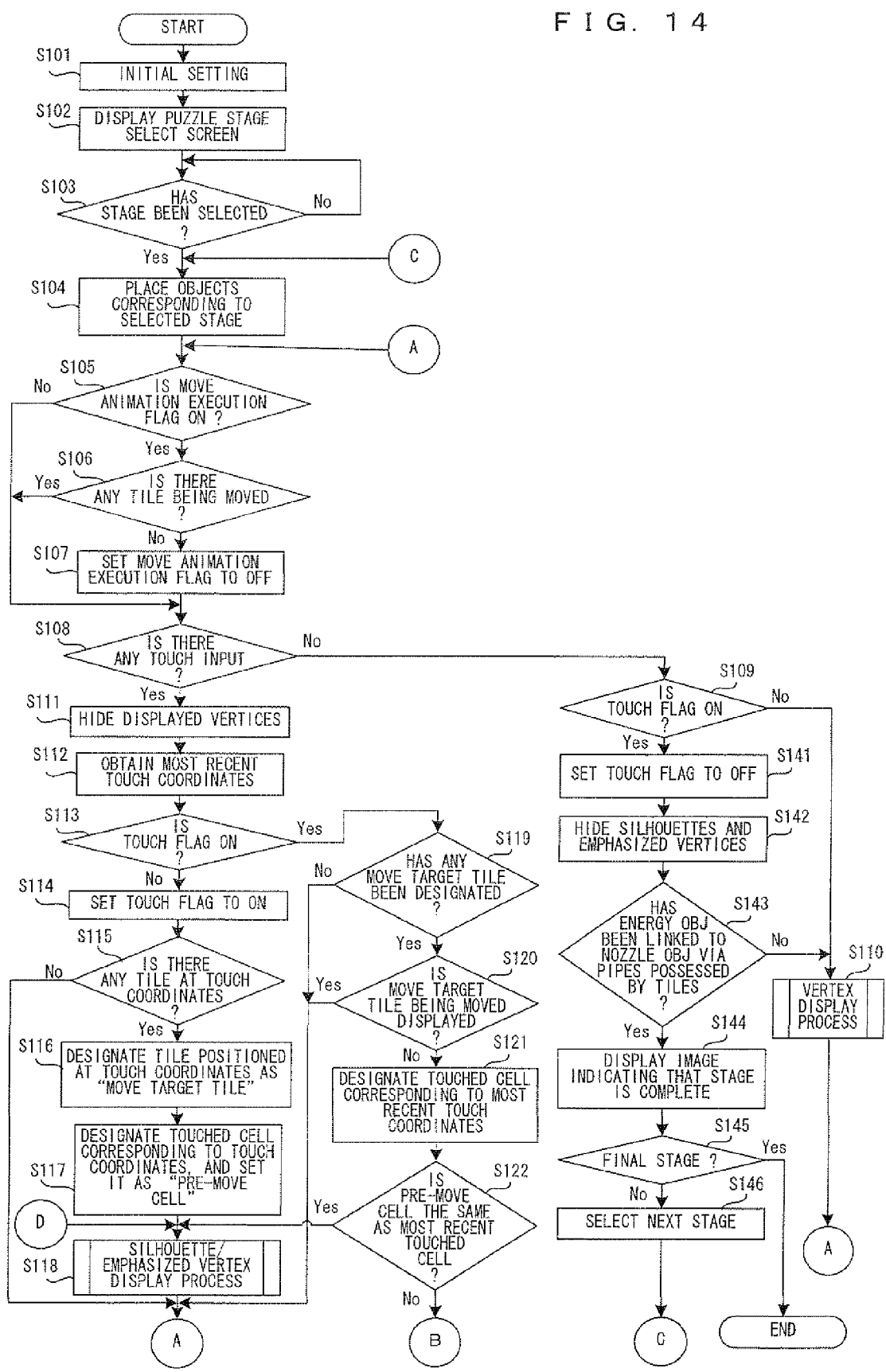
FIG. 14 is a diagram showing an example of a main flowchart of a game process performed by the game apparatus 1 executing the game program of the present invention.
Figure 15:
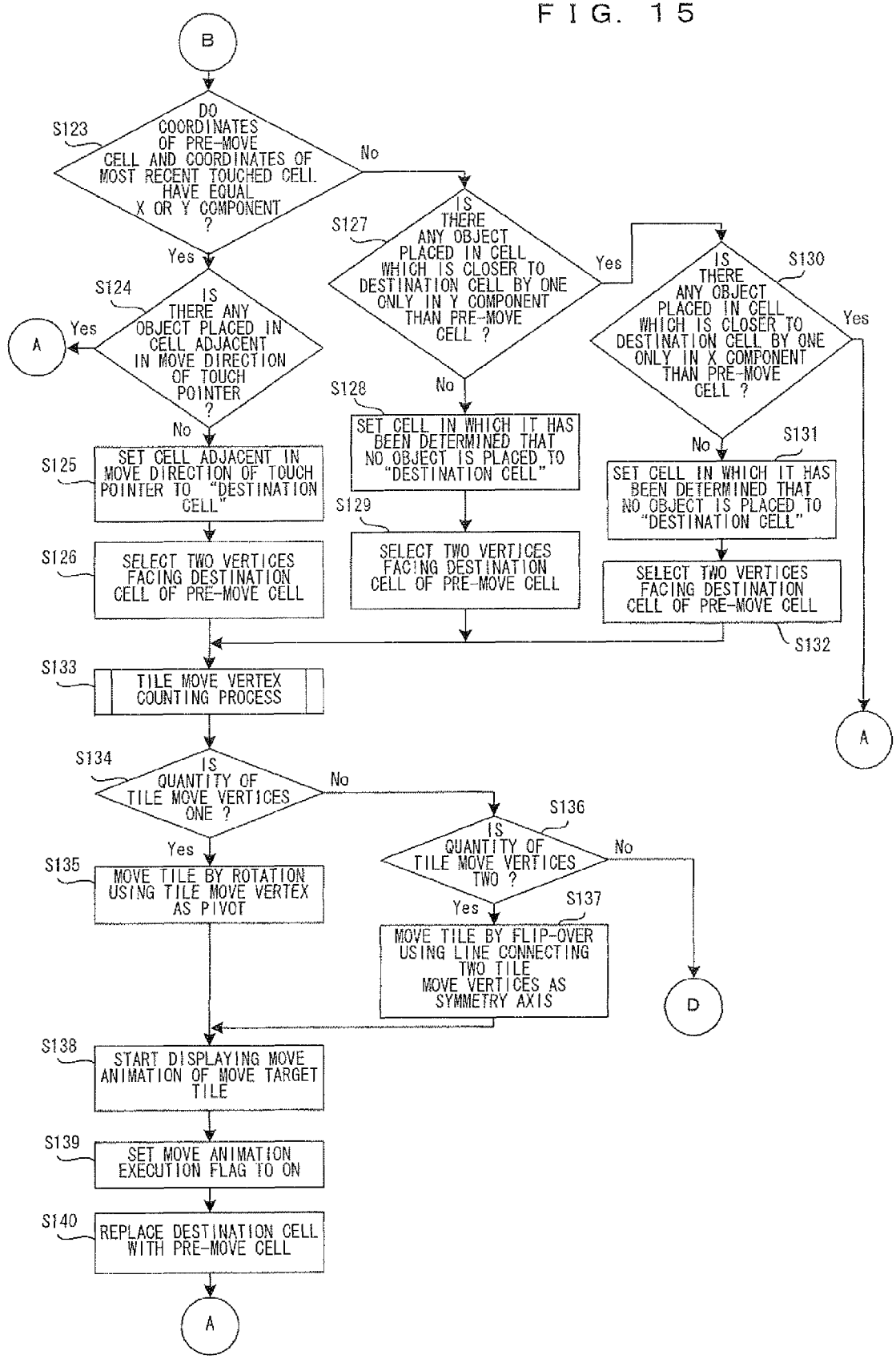
FIG. 15 is a diagram showing an example of the main flowchart of the game process performed by the game apparatus 1 executing the game program of the present invention.
Figure 16:
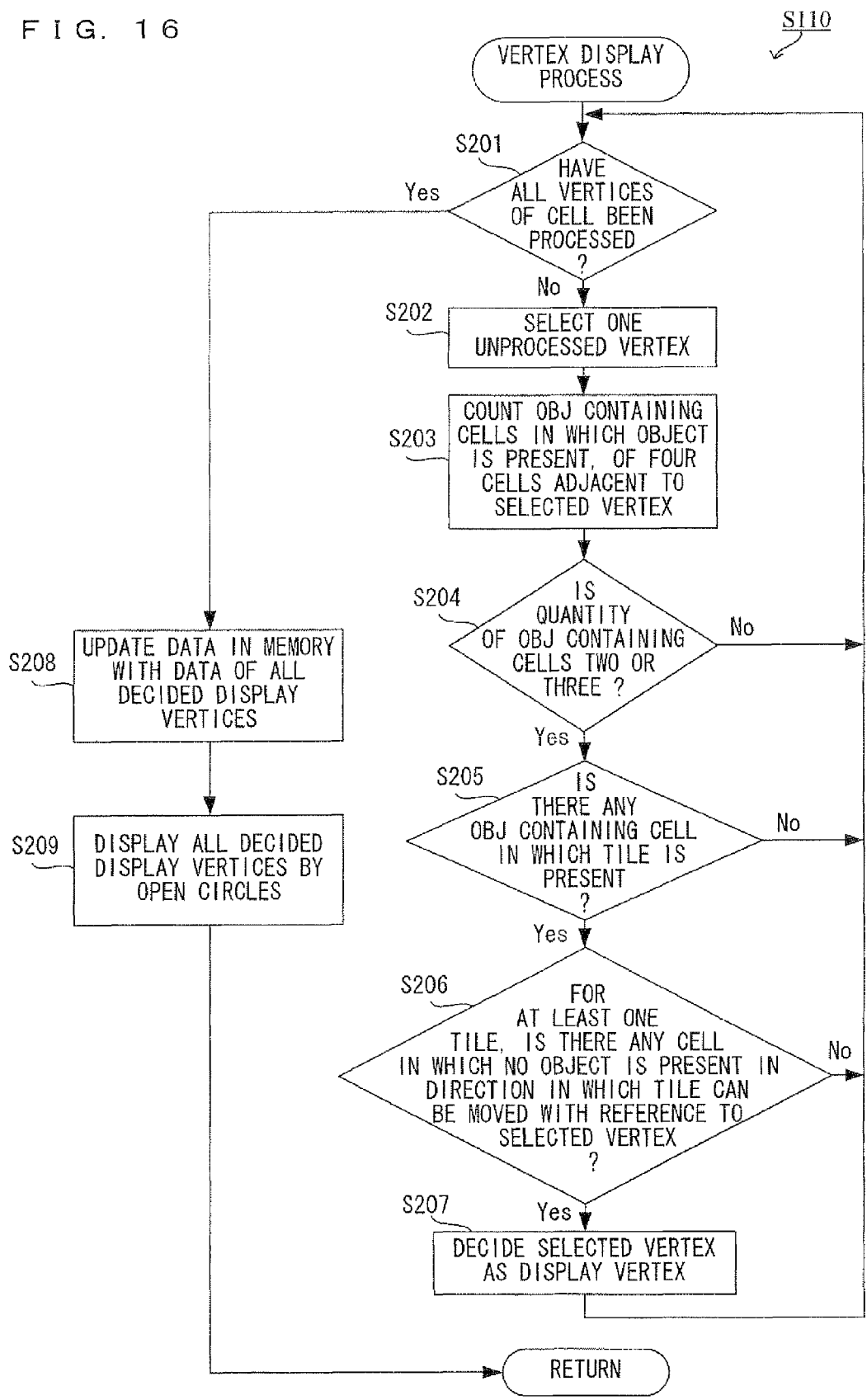
FIG. 16 is a diagram showing a subroutine which is an example of a predetermined process in the main flowchart of FIGS. 14 and 15.
Figure 17:
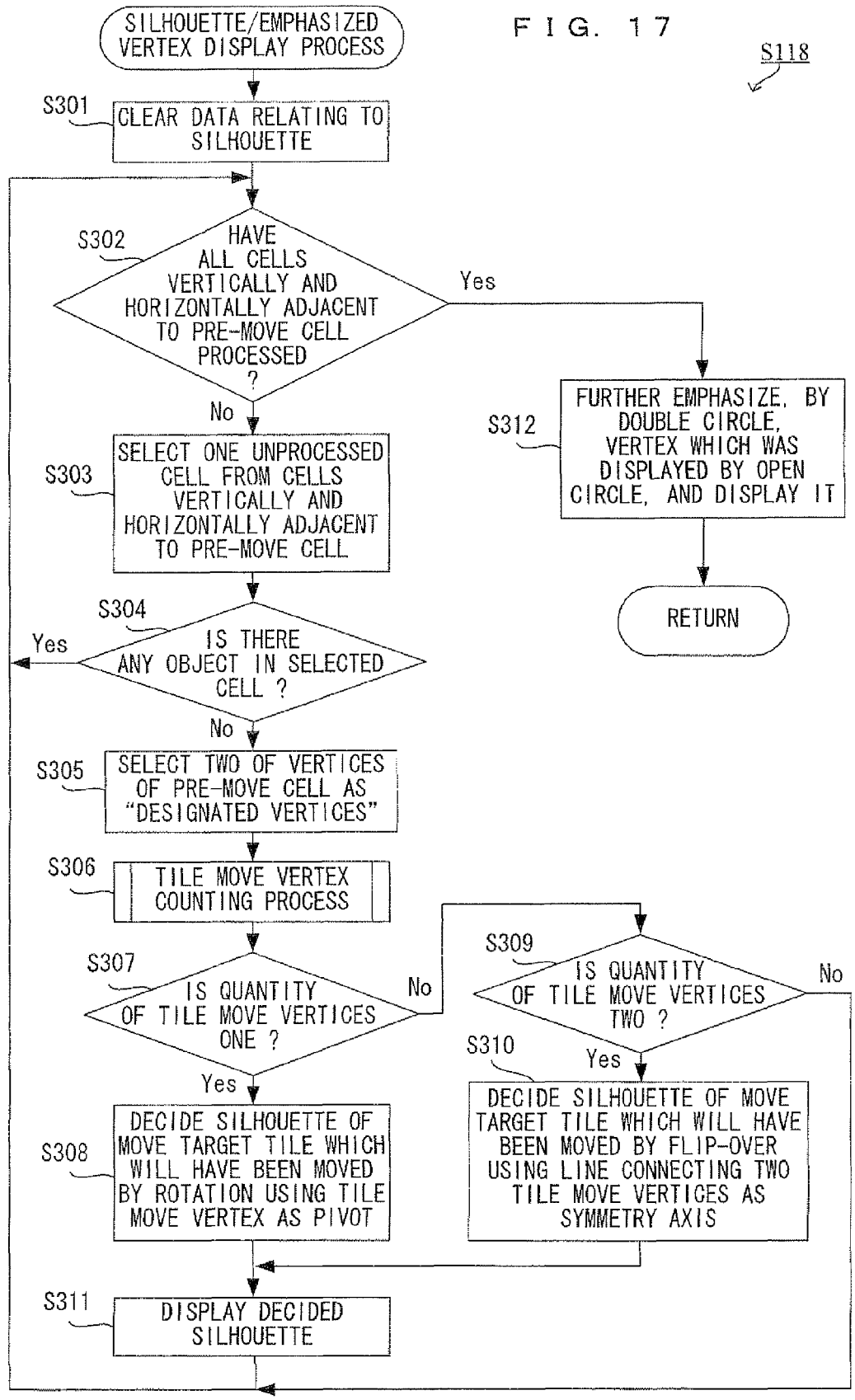
FIG. 17 is a diagram showing a subroutine which is an example of a predetermined process in the main flowchart of FIGS. 14 and 15.
Figure 18:
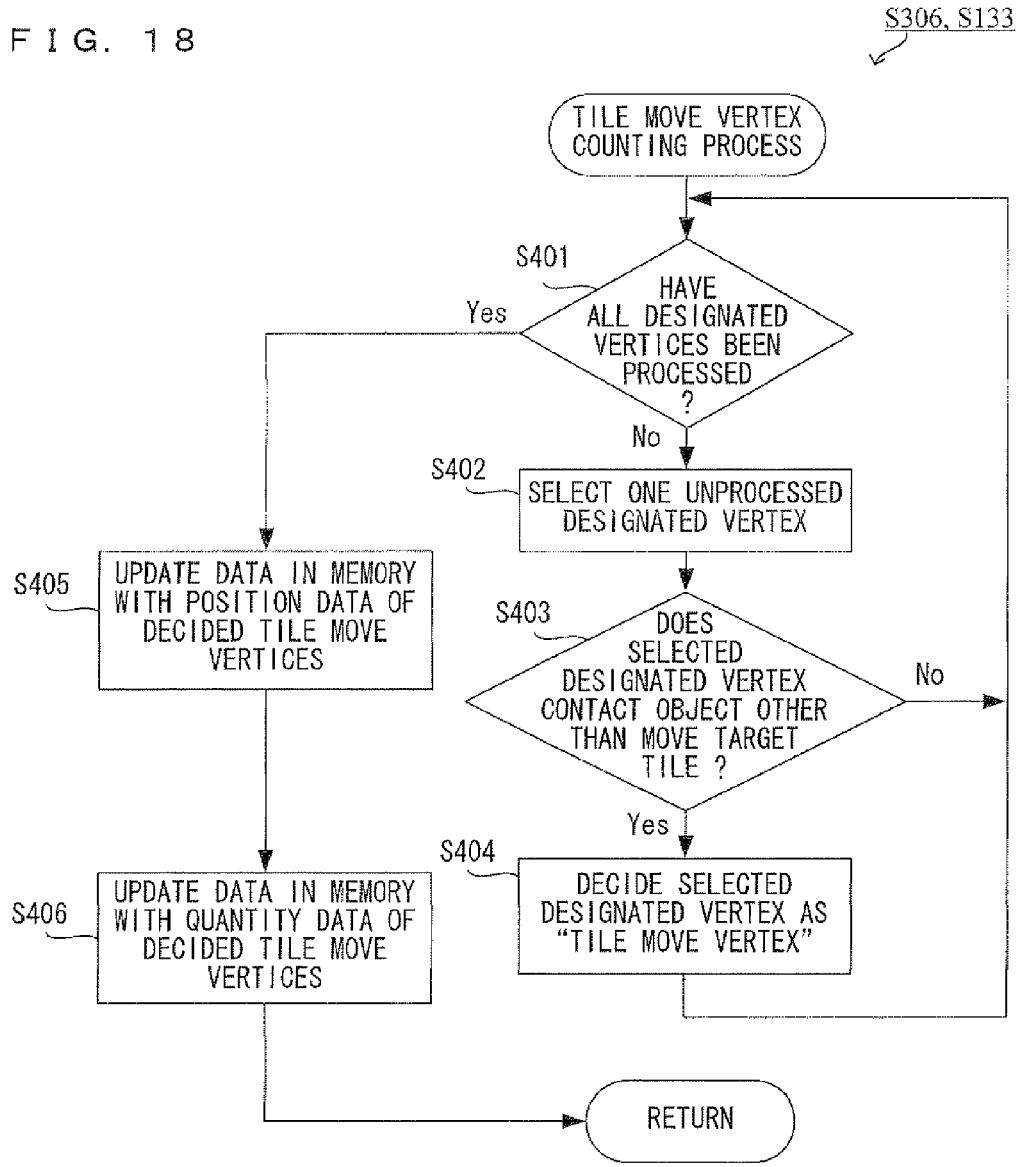
FIG. 18 is a diagram showing a subroutine which is an example of a predetermined process in the main flowchart of FIGS. 14 and 15.

Next, a specific procedure of the game program of the present invention executed by the game apparatus 1 will be described with reference to FIGS. 13 to 18. FIG. 13 is a diagram showing an example of various pieces of data which are stored in the main memory 32, depending on execution of the game program of the present invention. FIGS. 14 and 15 are diagrams showing an example of a main flowchart of a game process performed by the game apparatus 1 executing the game program of the present invention. FIGS. 16 to 18 are diagrams showing subroutines which are examples of predetermined processes in the main flowchart of FIGS. 14 and 15. Note that programs for executing these processes are included in a memory included in the game apparatus 1 (e.g., the saved data memory 34), the memory card 28, or the memory card 29. When the game apparatus 1 is powered ON, the programs are read out from the memory card 28 or the memory card 29 via the memory card I/F 36 or the memory card I/F 37, or from the built-in memory, into the main memory 32, and are then executed by the CPU 31. Also, the main memory 32 stores temporary data which is generated by an image process.

As shown in FIG. 13, a data storage area of the main memory 32 stores operation data Da, OBJ position data Db, OBJ type data Dc, OBJ orientation data Dd, vertex display position data De, touch flag data Df, touched cell coordinate data Dg, pre-move cell coordinate data Dh, move target tile data Di, destination cell coordinate data Dj, emphasized vertex display position data Dk, silhouette display position data Dl, silhouette type data Dm, silhouette orientation data Dn, tile move vertex position data Do, tile move vertex quantity data Dp, move animation execution flag data Dq, image data Dr and the like. Also, programs Pa included in the game program of the present invention are stored in a program storage area of the main memory 32.

The operation data Da is generated, depending on a player's operation of the game apparatus 1. Also, the operation data Da includes touch coordinate data indicating a touch position on the touch panel 13 where the player touches the touch panel 13 using the touch stylus 27 or the like. The touch coordinate data is acquired and updated at intervals of a game process cycle (e.g., 1/60 sec) of the game apparatus 1. Here, when the player is not touching the touch panel 13, a null value (void value) is stored as the touch coordinate data. The touch coordinate data may also be hereinafter referred to as touch coordinate data Da.

Figure 19:
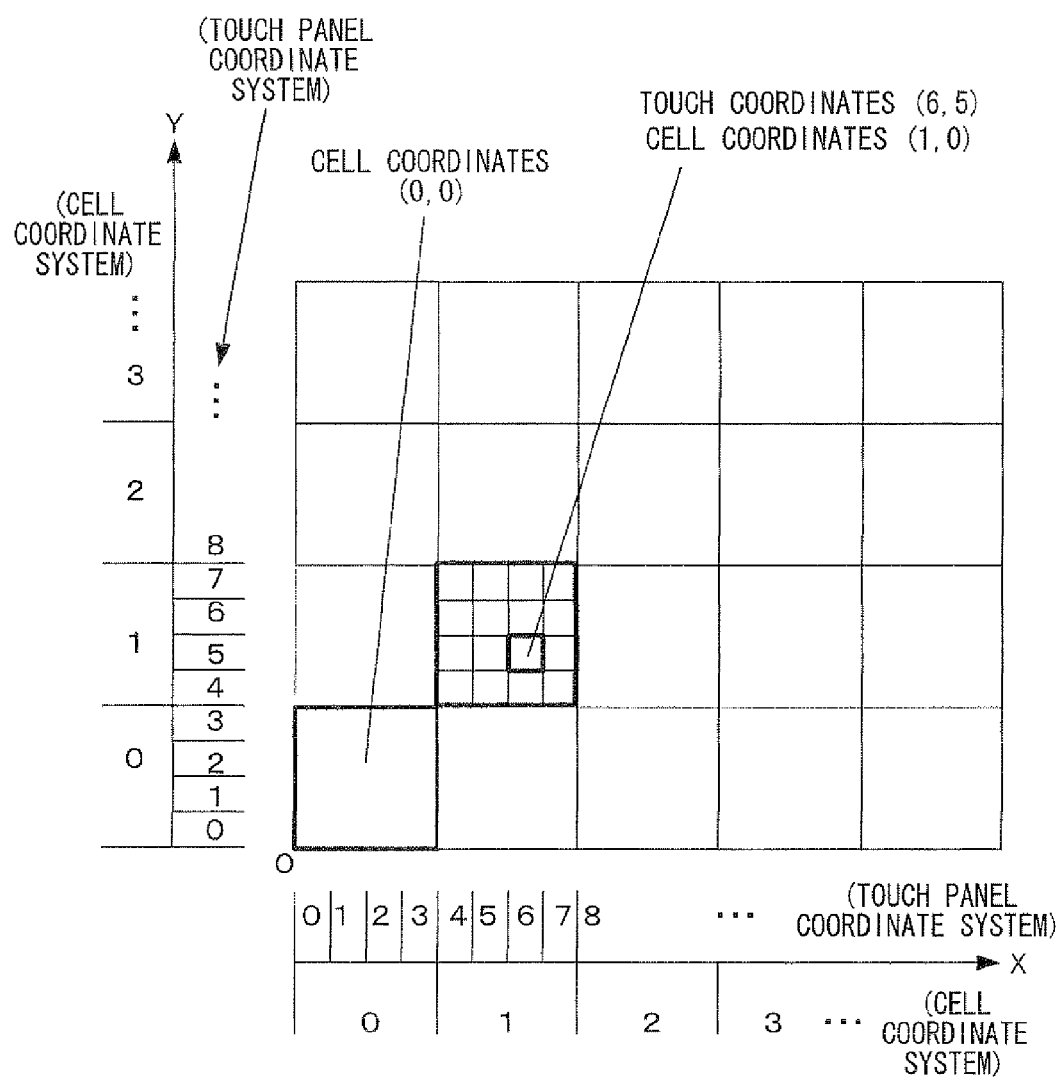
FIG. 19 is a schematic diagram for describing an example of a touch tile coordinate system and a cell coordinate system on a touch panel 13.

The OBJ position data Db indicates positions of objects displayed on the lower LCD 12. The positions of objects are represented by cell coordinates which will be described below using FIG. 19. FIG. 19 is a schematic diagram for describing an example of a touch tile coordinate system and a cell coordinate system on the touch panel 13. The touch tile coordinate system specifies touch coordinates indicating a touch position on the touch panel 13. The cell coordinate system specifies a cell in which an object displayed on the lower LCD 12 is placed. As shown in FIG. 19, the touch tile coordinate system and the cell coordinate system are, for example, XY coordinate systems having as the origin a lower left vertex O of the touch panel 13. Also, the touch tile coordinate system has a smaller interval between calibration marks than that of the cell coordinate system. In FIG. 19, as an example, the interval between calibration marks of the touch tile coordinate system is ¼ of that of the cell coordinate system. For example, when the OBJ position data Db indicates cell coordinates (0, 0) as the position of an object, the object is displayed on the lower LCD 12 in a cell having the cell coordinates (0, 0) as shown in FIG. 19.

The OBJ type data Dc indicates the type of each object placed in a cell specified by the cell coordinate system (hereinafter simply referred to as a cell). As described above, the object types include the nozzle OBJ 51, the energy OBJ 52, the L-shaped pipe tile 53, the I-shaped pipe tile 54, and the non-pipe tile 55.

The OBJ orientation data Dd indicates a display orientation of each object placed in a cell. FIG. 20 is a diagram showing an example of object types and display orientations of the object types. As shown in FIG. 20, the display orientations of the L-shaped pipe tile 53 include orientations 1 to 4, the display orientations of the I-shaped pipe tile 54 include orientations 1 and 2, the non-pipe tile 55 has only one display orientation, i.e., orientation 1, the nozzle OBJ 51 has only one display orientation, i.e., orientation 1, and the energy OBJ 52 has only one display orientation, i.e., orientation 1. Note that the I-shaped pipe tile 54 is vertically and horizontally symmetrical and therefore has two display forms, i.e., two display orientations (orientations 1 and 2). Also, the non-pipe tile 55 and the energy OBJ 52 each have the same display form when it faces whichever of the four directions, and therefore, have only one display orientation (orientation 1). Also, the nozzle OBJ 51 is a part of the rocket 50 displayed on the upper LCD 22, and therefore, has only one display orientation (orientation 1).

The vertex display position data De indicates the positions of vertices of cells which are decided in a vertex display process which will be described later with reference to FIG. 16 (see the open circles 56 of FIG. 3; hereinafter referred to as displayed vertices).

The touch flag data Df indicates ON/OFF of a touch flag which indicates whether or not the touch panel 13 is being touched by the touch stylus 27 or the like. The touch flag when ON indicates that the touch panel 13 is being touched, and the touch flag when OFF indicates that the touch panel 13 is not being touched.

The touched cell coordinate data Dg indicates coordinates (hereinafter referred to as touched cell coordinates) of a touched cell. As shown in FIG. 19, for example, when touch coordinates are (6, 5), touched cell coordinates are (1, 1).

The pre-move cell coordinate data Dh indicates cell coordinates at which a move target tile is positioned before being moved by a move target tile moving process.

The move target tile data Di indicates a tile designated as a target to be moved (i.e., a move target tile). Note that a tile which is placed in a touched cell during the start of touching is a move target tile.

The destination cell coordinate data Dj indicates the coordinates of a cell which is a destination of a move target tile.

The emphasized vertex display position data Dk indicates the position(s) of a vertex(s) of a touched cell of the positions of displayed vertices indicated by the vertex display position data De.

The silhouette display position data Dl indicates the displayed position(s) (cell coordinates) of a silhouette(s) of a tile displayed on the lower LCD 12.

The silhouette type data Dm indicates of the silhouette types of tiles displayed on the lower LCD 12.

The silhouette orientation data Dn indicates the display orientations of silhouettes of tiles displayed on the lower LCD 12. FIG. 21 is a diagram showing an example of the type silhouettes of tiles and the display orientations of each type. As shown in FIG. 21, the silhouette types include L-shaped pipe tile type, I-shaped pipe tile type, and non-pipe tile type. Also, as shown in FIG. 21, the display orientations of the silhouette of the L-shaped pipe tile type include orientations 1 to 4, the display orientations of the silhouette of the I-shaped pipe tile type include orientations 1 and 2, and the silhouette of the non-pipe tile type include only one display orientation, i.e., orientation 1. Note that the silhouette of the I-shaped pipe tile type is vertically and horizontally symmetrical and therefore have two display forms, i.e., two display orientations (orientations 1 and 2). Also, the silhouette of the non-pipe tile type has the same display form when it faces whichever of the four directions, and therefore, has only one display orientation (orientation 1).

The tile move vertex position data Do indicates the position(s) of a vertex(s) of a touched cell which is decided by a tile move vertex counting process which will be described later with reference to FIG. 18 (hereinafter the vertex is referred to as a tile move vertex).

The tile move vertex quantity data Dp indicates the quantity of tile move vertices which are decided by the tile move vertex counting process which will be described later with reference to FIG. 18.

The move animation execution flag data Dg indicates ON/OFF of a move animation execution flag which indicates whether or not animation in which a move target tile is moved (see FIGS. 5 and 8) is being executed. The move animation execution flag when ON indicates that animation in which a move target tile is moved is being executed. The move animation execution flag when OFF indicates that animation in which a move target tile is moved is not being executed.

The image data Dr is used to display game images of the objects 50 to 55 and the like on the game apparatus 1.

Next, an operation of the game apparatus 1 will be described with reference to FIGS. 14 to 18. Initially, when the power supply (power supply button 14F) of the game apparatus 1 is turned ON, the CPU 31 executes a boot program (not shown). As a result, a game program stored in the built-in memory, the memory card 28 or the memory card 29 is loaded into the main memory 32. Thereafter, processes shown in FIGS. 14 to 18 are executed by the loaded game program being executed by the CPU 31. Note that step is abbreviated as "S" in FIGS. 14 to 18.

Initially, in step 101 of FIG. 14, the CPU 31 performs initial setting of a game process. For example, as the initial setting, the CPU 31 initializes parameters stored in the main memory 32 to predetermined numerical values or states. By the initial setting, the touch flag data Df and the move animation execution flag data Dq are each set to an initial value indicating that the corresponding flag is OFF.

Next, in step 102, the CPU 31 causes, for example, the lower LCD 12 to display a puzzle stage select screen.

Next, in step 103, the CPU 31 waits until the player selects a puzzle stage (hereinafter simply referred to as a stage), and when a stage is selected, goes to a process of step 104. Note that, in this case, the player selects a desired stage from the puzzle stage select screen displayed on the lower LCD 12 by touching the touch panel 13 using, for example, the touch stylus 27.

Next, in step 104, the CPU 31 arranges objects corresponding to the stage selected in step 103 in virtual game space. Specifically, the CPU 31 reads out data indicating the positions, types and orientations of objects which are to be set during the start of the stage selected in step 103, from the memory card 28 or the memory card 29 via the memory card I/F 36 or the memory card I/F 37, or from the built-in memory, and stores them as the OBJ position data Db, the OBJ type data Dc and the OBJ orientation data Dd in the main memory 32. Thereafter, the CPU 31 places the rocket 50 in the virtual game space, and also places a plurality of objects in the virtual game space in accordance with the OBJ position data Db, the OBJ type data Dc and the OBJ orientation data Dd. Thereafter, the CPU 31 displays on the upper LCD 22 a region of the virtual game space in which the rocket 50 is placed, and also displays on the lower LCD 12 a region of the virtual game space in which the objects (tiles, etc.) are placed (see FIG. 3). In other words, in step 104, the CPU 31 generates and displays a stage selected by the player in the virtual game space.

Next, in step 105, the CPU 31 determines whether or not the move animation execution flag is ON, by referencing the move animation execution flag data Dg. The move animation execution flag is set to ON by processes of steps 138 and 139 of FIG. 15 which will be described below, when the display of move animation of the move target tile is started. When the move animation execution flag is OFF (NO in step 105), control goes to step 108. On the other hand, when the move animation execution flag is ON (YES in step 105), control goes to step 106.

In step 106, the CPU 31 determines whether or not there is any tile being moved. Specifically, the CPU 31 determines whether or not the display of move animation of the move target tile which was started in step 138 described later has been continued. When there is a tile being moved (YES in step 106), control goes to step 108. On the other hand, when there is no tile being moved (NO in step 106), control goes to step 107.

In step 107, the CPU 31 sets the move animation execution flag indicated by the move animation execution flag data Dq to OFF. Thereafter, control goes to step 108.

Next, in step 108, the CPU 31 detects whether or not the touch panel 13 is touched. This detection can be carried out by, for example, referencing the touch coordinate data Da to determine whether it indicates touch coordinates or a null value. When the touch coordinate data Da indicates touch coordinates, the CPU 31 can determine that the touch panel 13 is touched. On the other hand, when the touch coordinate data Ca indicates a null value, the CPU 31 can determine that the touch panel 13 is not touched. When it is not detected that the touch panel 13 is touched (YES in step 108), control goes to step 111. On the other hand, when it is not detected that the touch panel 13 is touched (NO in step 108), control goes to step 109.

In step 109, the CPU 31 determines whether or not the touch flag indicated by the touch flag data Df is ON. When the touch flag is ON (YES in step 109), control goes to step 141. On the other hand, when the touch flag is OFF (NO in step 109), control goes to step 110. Here, the touch flag is ON when touch was detected by the touch detection process of the previous step 108 (detection of touch in the previous frame) and touch is not detected by the current touch detection process (detection of touch in the current frame). In other words, the touch flag when ON in step 109 means a moment when touch is released from the touch panel 13. On the other hand, the touch flag is OFF when touch was not detected by the touch detection process of the previous step 108 (detection of touch in the previous frame). In other words, the touch flag when OFF in step 109 means that touch has been released from the touch panel 13 since at least one frame ago.

In step 110, the CPU 31 performs a vertex display process shown in FIG. 16. The vertex display process is performed so as to display the open circles 56 (displayed vertices) of FIG. 3. The vertex display process will be described hereinafter with reference to FIG. 16.

In step 201, the CPU 31 determines whether or not all cell vertices have been subjected to processes of steps 202 to 207. When the CPU 31 determines that all cell vertices have been subjected to processes of steps 202 to 207 (YES in step 201), control goes to step 207. On the other hand, when not all cell vertices have been subjected to processes of steps 202 to 207 (NO in step 201), control goes to step 202.

In step 202, the CPU 31 selects one cell vertex which has not been subjected to the process of step 203.

Next, in step 203, the CPU 31 counts the number of cells in which an object is present (hereinafter referred to as OBJ containing cells) of four cells adjacent to the vertex selected in step 202, by referencing the OBJ position data Db. Here, the object means a nozzle OBJ 51, an energy OBJ 52, an L-shaped pipe tile 53, an I-shaped pipe tile 54, a non-pipe tile 55 or the like.

Next, in step 204, the CPU 31 determines whether or not the number of OBJ containing cells counted in step 203 is two or three. When the number of OBJ containing cells is neither two nor three (NO in step 204, i.e., the number of OBJ containing cells is zero, one or four), control returns to step 201. In step 204, the CPU 31 determines whether or not the vertex selected in step 202 can serve as a pivot used for rotation movement described later or as a point included in a symmetry axis used for flip-over movement described later. When the number of OBJ containing cells is zero, there are no objects in the cells adjacent to the vertex, and therefore, the vertex cannot serve as a pivot or a point included in a symmetry axis. When the number of OBJ containing cells is one, there is only one object in the cells adjacent to the vertex, the vertex cannot serve as a pivot or a point included in a symmetry axis. When the number of OBJ containing cells is four, there is no space in which a tile can be moved by rotation using the vertex as a pivot or by flip-over using the vertex as a part of a symmetry axis, and therefore, the vertex cannot serve as a pivot or a point included in a symmetry axis. On the other hand, when the number of OBJ containing cells is two or three (YES in step 204), the vertex can serve as a pivot or a point included in a symmetry axis, and control goes to step 205.

In step 205, the CPU 31 determines whether or not there is an OBJ containing cell in which a tile (i.e., any of an L-shaped pipe tile 53, an I-shaped pipe tile 54 and a non-pipe tile 55 that the player can move by rotation or flip-over), of the OBJ containing cells counted in step 203. When there is no OBJ containing cell in which a tile is present (NO in step 205) control returns to step 201. This is because, when there is no "tile" that can be moved by rotation or flip-over, the vertex selected in step 202 cannot serve as a pivot for rotation movement of a tile or a point included in a symmetry axis for flip-over movement of a tile. On the other hand, there is an OBJ containing cell in which a tile is present (YES in step 205), control goes to step 206.

In step 206, for at least one of the tiles whose presence has been confirmed in step 205, the CPU 31 determines whether or not there is any cell in which no object is present, in at least one movement direction in which the tile can be moved by rotation or flip-over with reference to the vertex selected in step 202. More specifically, for all tiles whose presence has been confirmed in step 205, the CPU 31 determines whether or not there is any cell in which no object is present, in at least one direction in which rotation movement or flip-over movement can be performed with reference to the vertex selected in step 202, and whether or not there is at least one tile which satisfies such a condition. Here, the term "can be rotated by rotation or flip-over" means that the tile can be rotated by rotation or flip-over, assuming that there is no object present in a movement direction. This is because, when there is not a cell in which an object is present, in any direction in which rotation movement or flip-over movement is performed with reference to the selected vertex, i.e., when, for each of all tiles adjacent to the selected vertex, there is an object in cells in all directions in which the tile can be moved, none of the tiles can be moved by rotation or flip-over with reference to the vertex, and therefore, the vertex cannot serve as a pivot for rotation movement of a tile or a point included in a symmetry axis for flip-over movement of a tile. Specifically, when, for each of all tiles whose presence has been confirmed in step 205, there is an object in all directions in which the tile can be moved with reference to the selected vertex (NO in step 206), control returns to step 201. On the other hand, when, of the tiles whose presence has been confirmed in step 205, there is at least one tile having a cell in which an object is not present in any direction in which the tile can be moved with reference to the selected vertex (YES in step 206), control goes to step 207.

In step 207, the CPU 31 decides that the vertex selected in step 202 is set as a displayed vertex with an open circle. Thereafter, control returns to step 201. By repeatedly performing the aforementioned processes of steps 201 to 207, it is decided whether or not an open circle is to be displayed, for all cell vertices.

Thereafter, in step 201, when the CPU 31 determines that all cell vertices have been subjected to the processes of steps 203 to 207 (YES in step 201), control goes to step 208.

In step 208, the CPU 31 updates the vertex display position data De with the position data of all displayed vertices that it has been decided in step 207 that are to be displayed by open circles.

Next, in step 209, the CPU 31 displays all displayed vertices by open circles 56, as shown in FIG. 3 as an example, based on the vertex display position data Be updated in step 208. Thus, the vertex display process is completed, and control returns to step 105 of FIG. 14. Note that, as will be seen later, the player can predict the movement form (rotation movement flip-over movement) of a tile from a displayed vertex(s) displayed by an open circle(s) 56.

Thereafter, control goes to step 108. A case where the CPU 31 detects that the touch panel 13 is touched (YES in step 108) and control goes to step 111, will be described.

In step 111, the CPU 31 hides the open circles 56 (see FIG. 3) displayed in step 110.

Next, in step 112, the CPU 31 acquires touch coordinates from the touch coordinate data Da. Note that, as described above, the touch coordinate data Da is always updated with most recent touch coordinates while the touch panel 13 is being touched. Also, a null value is stored in the touch coordinate data Da while the touch panel 13 is not being touched.

Next, in step 113, the CPU 31 determines whether or not the touch flag is ON, by referencing the touch flag data Df. When the touch flag is ON (YES in step 113), control goes to step 119. On the other hand, when the touch flag is OFF (NO in step 113), control goes to step 114. Here, the touch flag when ON means that touch was detected by the touch detection process of the previous step 108 (detection of touch in the previous frame). On the other hand, the touch flag when OFF means that touch was not detected by the touch detection process of the previous step 108 (detection of touch in the previous frame) and the start of touch is detected by the touch detection process of the current step 108 (detection of touch in the current frame). In other words, when touch is started, control goes through step 114 and steps following this, and thereafter, when the touch is continued, control goes through steps 119 and steps following this.

Next, in step 114, the CPU 31 sets the touch flag indicated by the touch flag data Df to ON.

Next, in step 115, the CPU 31 determines whether or not a tile (movable object) is positioned at the touch coordinates acquired in step 112, by referencing the OBJ position data Db and the OBJ type data Dc. When no tile is positioned (NO in step 115), control returns to step 105. On the other hand, when a tile is positioned (YES in step 115), control goes to step 116.

Next, in step 116, the CPU 31 designates as a move target tile the tile which is positioned at the touch coordinates acquired in step 112, and updates the move target tile data Di with the data of the move target tile.

Next, in step 117, the CPU 31 identifies a touched cell in which touch is started on the touch panel 13, based on the touch coordinates acquired in step 112, and sets the touched cell as a cell in which a move target tile is present (hereinafter referred to as a "pre-move cell"). Also, in this case, the CPU 31 updates the pre-move cell coordinate data Dh with the coordinate data of the identified touched cell. For example, as shown in FIG. 19, when the touch coordinates acquired in step 112 are (6, 5), the CPU 31 specifies touched cell coordinates containing the touch coordinates (6, 5) as (1, 1), updates the pre-move cell coordinate data Dh with the data of the touched cell coordinates, and sets a cell positioned at the touched cell coordinates as a "pre-move cell."

Next, in step 118, the CPU 31 performs a silhouette/emphasized vertex display process shown in FIG. 17. The silhouette/emphasized vertex display process will be described hereinafter with reference to FIG. 17.

In step 301, the CPU 31 clears data relating to silhouettes. Specifically, the CPU 31 stores null values to the silhouette display position data Dl, the silhouette type data Dm and the silhouette orientation data Dn.

Next, in step 302, the CPU 31 determines whether or not all four cells vertically and horizontally adjacent to the pre-move cell have been subjected to processes of steps 303 to 311 which will be described later. When the CPU 31 determines that all the four cells have been subjected to the processes of steps 303 to 311 (YES in step 302), control goes to step 312. On the other hand, when not all the four cells have been subjected to the processes of steps 303 to 311 (NO in step 302), control goes to step 303.

In step 303, the CPU 31 selects one cell which has not been subjected to the process of step 304, from the four cells vertically and horizontally adjacent to the pre-move cell.

Next, in step 304, the CPU 31 determines whether or not an object is placed in the cell selected in step 303, by referencing the OBJ position data Db. When an object is placed in the cell (YES in step 304), control returns to step 302. On the other hand, when no object is placed in the cell (NO in step 304), control goes to step 305. A cell in which no object is placed may be hereinafter referred to as an "empty cell." Note that a tile can be moved to an empty cell.

in step 305, the CPU 31 selects as "designated vertices" two vertices facing in a direction in which the empty cell selected in step 303 is present as viewed from the pre-move cell, from the vertices of the pre-move cell.

Next, in step 306, the CPU 31 performs a tile move vertex counting process shown in FIG. 18 with respect to the two designated vertices selected in step 305. In other words, in step 306, the CPU 31 counts the number of pivots for rotation movement or points included in a symmetry axis for flip-over movement, among the two designated vertices. The tile move vertex counting process will be described hereinafter with reference to FIG. 18.

In step 401, the CPU 31 determines whether or not the two designated vertices have been subjected to processes of steps 402 to 404 which will be described below. When the CPU 31 determines that the two designated vertices have been subjected to the processes of steps 402 to 404 (YES in step 401), control goes to step 405. On the other hand, when not both the two designated vertices have been subjected to the processes of steps 402 to 404 (NO in step 401), control goes to step 402.

In step 402, the CPU 31 selects one designated vertex which has not been subjected to the process of step 403.

Next, in step 403, the CPU 31 determines whether or not an object (a nozzle OBJ 51, an energy OBJ 52, and a non-selected tile) other than the move target tile designated in step 116 of FIG. 14 is adjacent to the designated vertex selected in step 402. When no object other than the move target tile is adjacent (NO in step 403), control returns to step 401. On the other hand, when an object other than the move target tile is adjacent (YES in step 403), control goes to step 404.

In step 404, the CPU 31 decides the designated vertex selected in step 402 as a "tile move vertex." The tile move vertex can serve as a pivot of rotation movement for the move target tile or a point included in a symmetry axis of flip-over movement for the move target tile. Thereafter, control returns to step 401. Thereafter, in step 401, when the CPU 31 determines that all the designated vertices have been subjected to the processes of steps 402 to 404, control goes to step 405.

In step 405, the CPU 31 updates the tile move vertex position data Do with the position data of all the tile move vertices decided in step 404. Note that, when no tile move vertex has been decided in step 404, a null value is stored into the tile move vertex position data Do.

Next, in step 406, the CPU 31 updates the tile move vertex quantity data Dp with the quantity data of the tile move vertex(s) decided in step 404. Note that the quantity of tile move vertices is any one of 0 to 2, and therefore, the quantity indicated by the tile move vertex quantity data Dp is any one of 0 to 2. Thus, the tile move vertex counting process of step 306 is completed, and control goes to step 307 of FIG. 17.

In step 307 of FIG. 17, the CPU 31 determines whether or not the quantity of tile move vertices counted in step 306 is one, by referencing the tile move vertex quantity data Dp. When the quantity of tile move vertices is not one (NO in step 307), control goes to step 309. On the other hand, when the quantity of tile move vertices is one (YES in step 307), control goes to step 308.

In step 308, the CPU 31 decides a silhouette which indicates a form of the move target tile which will have been moved to the cell selected in step 303 by rotation using the tile move vertex decided in step 306 as a pivot. Thereafter, the CPU 31 stores the position (cell coordinates) data of the cell selected in step 303 into the silhouette display position data Dl, and stores pieces of data indicating the type and orientation of the decided silhouette in association with the position data, into the OBJ type data Dm and the OBJ orientation data Dn, respectively. The process of step 308 will be specifically described hereinafter with reference to FIGS. 4, 20 and 21. In FIG. 4, an L-shaped pipe tile 53 on which the touch pointer 57 is displayed is the move target tile. A case where the cell selected in step 303 is a cell B below and adjacent to the move target tile, will be described. In this case, the tile move vertex decided in step 306 is a double circle indicated by a. Initially, the CPU 31 acquires the type "L-shaped pipe tile" and the orientation "orientation 1" of the move target tile by referencing the OBJ type data Dc and the OBJ orientation data Dd, respectively (see FIG. 20). Next, the CPU 31 acquires the position "the position of the double circle indicated by a" of the tile move vertex decided in step 306, by referencing the tile move vertex position data Do. Next, the CPU 31 decides a silhouette having the L-shaped pipe tile type and the orientation 4 shown in FIG. 21 as a silhouette indicating a form of the move target tile which will have been moved to the cell B by rotation using the position of the double circle as a pivot. Next, the CPU 31 stores the position data of the cell B as the silhouette display position data Dl, and stores pieces of data indicating the type "L-shaped pipe tile type" and the orientation "orientation 4" of the silhouette in association with the position data, as the silhouette type data Dm and the silhouette orientation data Dn, respectively. Thereafter, control goes to step 311.

Next, in step 311, the CPU 31 displays the silhouette having the type indicated by the silhouette type data Dm and the orientation indicated by the silhouette orientation data Dn at the cell coordinates indicated by the silhouette display position data Dl. In the example of FIG. 4, the silhouette having the "L-shaped pipe tile type" and the orientation 4 is displayed in the cell B (see FIG. 21). Thereafter, control returns to step 302.

A case where the CPU 31 determines in step 307 that the quantity of tile move vertices is not one (NO in step 307), and control goes to step 309, will be described hereinafter.

In step 309, the CPU 31 determines whether or not the quantity of tile move vertices counted in step 306 is two, by referencing the tile move vertex quantity data Dp. When the quantity of tile move vertices is not two (NO in step 309; the quantity of tile move vertices is zero), control returns to step 302. On the other hand, when the quantity of tile move vertices is two (YES in step 309), control goes to step 310.

In step 310, the CPU 31 decides a silhouette indicating a form of the move target tile which will have been moved to the cell selected in step 303 by flip-over using a line connecting the two tile move vertices decided in step 306 as a symmetry axis. Thereafter, the CPU 31 stores the position (cell coordinates) data of the cell selected in step 303 into the silhouette display position data Dl, and stores pieces of data indicating the type and orientation of the decided silhouette in association with the position data, as the silhouette type data Dm and the silhouette orientation data Dn, respectively. The process of step 310 will be specifically described hereinafter with respect to FIGS. 7, 20 and 21. In FIG. 7, an I-shaped pipe tile 54 on which a touch pointer 57 is displayed is the move target tile. A case where the cell selected in step 303 is a cell D right-adjacent to the move target tile, will be described. In this case, the two tile move vertices decided in step 306 are a double circle indicated by "b" and a double circle indicated by "c," respectively. Initially, the CPU 31 acquires the type "I-shaped pipe tile" and the orientation "orientation 1" of the move target tile, by referencing the OBJ type data Dc and the OBJ orientation data Dd, respectively (see FIG. 20). Next, the CPU 31 acquires the positions "the position of the double circle indicated by b and the position of the double circle indicated by c" of the tile move vertices decided in step 306, by referencing the tile move vertex position data Do. Next, the CPU 31 decides a silhouette having the I-shaped pipe tile type and the orientation 1 of FIG. 21, as a form of the move target tile which will have been moved to the cell D by flip-over using a line connecting the double circle indicated by "b" and the double circle indicated by "c" as a symmetry axis. Next, the CPU 31 stores the position data of the cell D into the silhouette display position data Dl, and stores pieces of data indicating the type "I-shaped pipe tile type" and the "orientation 1" of the silhouette, in association with the position data, as the silhouette type data Dm and the silhouette orientation data Do, respectively. Thereafter, control goes to step 311.

Next, in step 311, the CPU 31 displays the silhouette having the type indicated by the silhouette type data Dm and the orientation indicated by the silhouette orientation data Do at the cell coordinates indicated by the silhouette display position data Dl. In the example of FIG. 7, a silhouette having the "I-shaped pipe tile type" and the orientation 1 is displayed in the cell D (see FIG. 21). Thereafter, control returns to step 302.

In step 302, when the CPU 31 determines that all of the pre-move cell and the four cells vertically and horizontally adjacent thereto have been subjected to the processes of steps 303 to 311 (YES in step 302), control goes to step 312.

In step 312, the CPU 31 emphasizes a vertex(s) which has been displayed with an open circle(s) 56 by the process of step 110 of FIG. 14, by a double circle(s) 58, of four vertices of the pre-move cell (see FIGS. 3 and 4). Thus, the silhouette/emphasized vertex display process (step 118) is completed, and control returns to step 105 of FIG. 14. As described above, a form of a move target tile which will have been moved is displayed, as a silhouette in a cell to which the move target tile can be moved, by the silhouette/emphasized vertex display process. As a result, the player, when designating a move target tile by a touch pointer 57, can know a state of the move target tile which will have been moved.

A case where the CPU 31 confirms in step 113 that the touch flag is ON and control goes to step 119, will be described. Specifically, a process in a case where the touch panel 13 continues to be touched, will be described.

In step 119, the CPU 31 determines whether or not a move target tile is designated, by referencing the move target tile data Di. When no move target tile is designated (NO in step 119), control returns to step 105. For example, when the move target tile data Di indicates a null value, the CPU 31 determines that no move target tile is designated. On the other hand, when a move target tile is designated (YES in step 119), control goes to step 120.

In step 120, the CPU 31 determines whether or not the move target tile being moved is being displayed, by referencing the move animation execution flag data Dq. Note that the move animation execution flag data Dq indicates ON/OF of the move animation execution flag. Also, the move animation execution flag is set to ON only during a period of time when a move target tile being moved is being displayed by the processes of steps 105 to 107, 138 and 139, and to OFF when a move target tile being moved is not being displayed. When the move target tile being moved is being displayed (see FIGS. 5 and 8; YES in step 120), control returns to step 105. Specifically, when a tile being moved is being displayed, even if another tile is present at the current touch coordinates, the latter tile is not moved by rotation or flip-over. On the other hand, when the move target tile being moved is not being displayed (NO in step 120), control goes to step 121.

In step 121, the CPU 31 identifies the most recent touched cell which continues to be touched (hereinafter referred to as a "most recent touched cell") by specifying the coordinates of the most recent touched cell which continues to be touched on the touch panel 13, based on the most recent touch coordinates acquired in the immediately previous step 112 (see FIG. 19). Also, in this case, the CPU 31 updates the touched cell coordinate data Dg with the data of the most recent touched cell coordinates.

Next, in step 122, the CPU 31 determines whether or not the pre-move cell is the same as the most recent touched cell, by referencing the pre-move cell coordinate data Dh and the touched cell coordinate data Dg. When the pre-move cell is the same as the most recent touched cell (YES in step 122), control goes to step 118, in which the silhouette/emphasized vertex display process which has been described above with reference to FIG. 17 is performed. On the other hand, when the pre-move cell is not the same as the most recent touched cell (NO in step 122), control goes to step 123. In other words, in step 122, the CPU 31 determines whether or not the touch coordinates (the touch pointer 57) identifying the move target tile has been moved from the pre-move cell in which the move target tile was present to another cell. More briefly, the CPU 31 determines whether or not the move target tile has been dragged to another cell using the touch pointer 57.

In step 123 of FIG. 15, the CPU 31 determines whether or not the cell coordinates of the pre-move cell and the cell coordinates of the most recent touched cell have the same X-axis value (X component) or Y-axis value (Y component). Specifically, the CPU 31 determines whether the touch pointer 57 has been moved from the pre-move cell to a cell positioned in the vertical or horizontal direction with respect to the pre-move cell or to a cell positioned in a diagonal direction with respect to the pre-move cell. When the CPU 31 determines that the cell coordinates of the pre-move cell and the cell coordinates of the most recent touched cell do not have the same X- or Y-axis value (NO in step 123), control goes to step 127. On the other hand, when the CPU 31 determines that the cell coordinates of the pre-move cell and the cell coordinates of the most recent touched cell have the same X- or Y-axis value (YES in step 123), control goes to step 124.

In step 124, the CPU 31 determines whether or not an object is placed in a cell adjacent to the pre-move cell in a direction in which the touch pointer 57 has been moved. When an object is placed in the cell (YES in step 124), control returns to step 105. On the other hand, when no object is placed in the cell (NO in step 124), control goes to step 125.

Figure 22:
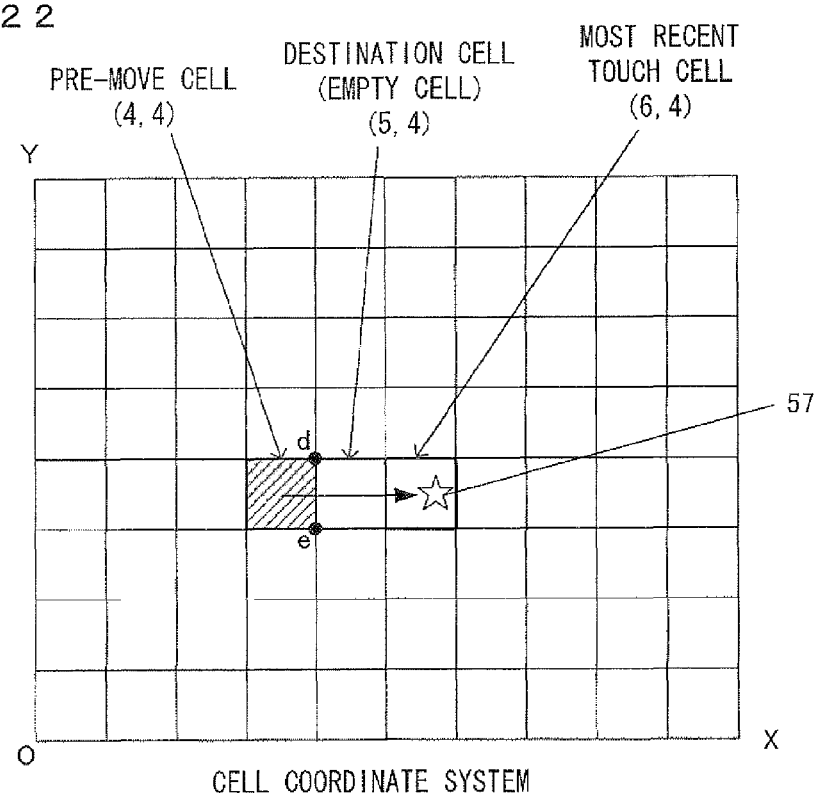
FIG. 22 is a diagram for specifically describing an example of the process of step 125 of FIG. 15.

In step 125, the CPU 31 sets the cell adjacent to the pre-move cell in the direction in which the touch pointer 57 has been moved, as a "destination cell" which is a destination of the move target tile. Thereafter, the CPU 31 updates the destination cell coordinate data Dj with data indicating the coordinates of the destination cell thus set. FIG. 22 is a diagram for specifically describing an example of the process of step 125. In FIG. 22, the coordinates of a pre-move cell in which a move target tile is positioned are (4, 4), and the coordinates of a most recent touched cell indicated by a touch pointer 57 are (6, 4). In this case, as shown in FIG. 22, the coordinates of a destination cell are (5, 4) which are adjacent to the coordinates (4, 4) of the pre-move cell in the positive direction of the X axis in which the touch pointer 57 has been moved.

Next, in step 126, the CPU 31 selects as designated vertices two vertices facing the destination cell set in step 125 of the pre-move cell. By this process, for example, in FIG. 22, a vertex d and a vertex e of the pre-move cell are selected as designated vertices. Thereafter, control goes to step 133.

A case where the CPU 31 determines in step 123 that the X-axis values (X components) or the Y-axis values (Y components) are not equal (NO in step 123), and control goes to step 127, will be described hereinafter. In other words, a case where the touch pointer 57 is moved in a direction diagonal with respect to the pre-move cell, will be described.

In step 127, the CPU 31 determines whether or not an object is placed in a cell whose X coordinate is the same as that of the pre-move cell and whose Y coordinate is closer to the Y coordinate of the most recent touched cell by one than the Y coordinate of the pre-move cell is. When an object is placed in the cell (YES in step 127), control goes to step 130.

On the other hand, when no object is placed in the cell (NO in step 127), control goes to step 128.

Figure 23:
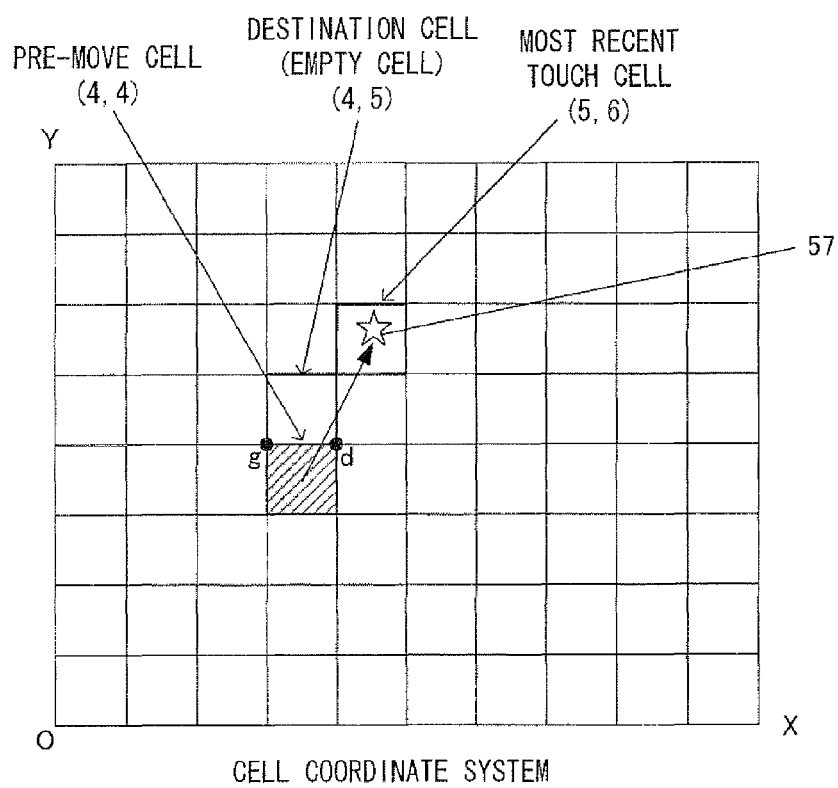
FIG. 23 is a diagram for specifically describing an example of the process of step 128 of FIG. 15.

In step 128, the CPU 31 sets as a destination cell the cell in which it has been determined in step 127 that no object is placed. Thereafter, the CPU 31 updates the destination cell coordinate data Dj with data indicating the coordinates of the destination cell thus set. FIG. 23 is a schematic diagram for specifically describing an example of the process of step 128. In FIG. 23, the coordinates of a pre-move cell in which a move target tile is positioned are (4, 4), and the coordinates of a most recent touched cell indicated by a touch pointer 57 are (5, 6). In this case, as shown in FIG. 23, the coordinates of the destination cell are (4, 5) which are adjacent to (shifted by one from) the coordinates (4, 4) of the pre-move cell in the positive direction of the Y-axis in which the touch pointer 57 has been moved.

Next, in step 129, the CPU 31 selects as designated vertices two vertices facing the destination cell set in step 128 of the pre-move cell. By this process, for example, in FIG. 23, a vertex d and a vertex g of the pre-move cell are selected as designated vertices. Thereafter, control goes to step 133.

Next, a case where the result of the determination in step 127 is positive and control goes to step 130, will be described. In this case, in step 130, the CPU 31 determines whether or not an object is placed in a cell whose Y coordinate is the same as that of the pre-move cell and whose X coordinate is closer to the X coordinate of the most recent touched cell by one than the X coordinate of the pre-move cell is. When an object is placed in the cell (YES in step 130), control returns to step 105. On the other hand, when no object is placed in the cell (NO in step 130), control goes to step 131.

In step 131, the CPU 31 sets as a destination cell the cell in which it has been determined in step 130 that no object is placed. Thereafter, the CPU 31 updates the destination cell coordinate data Dj with data indicating the coordinates of the destination cell thus set. FIG. 24 is a schematic diagram for specifically describing an example of the process of step 131. In FIG. 24, the coordinates of a pre-move cell in which a move target tile is positioned are (4, 4), the coordinates of a most recent touched cell indicated, by a touch pointer 57 are (5, 6), and an object is placed in a cell (coordinates (4, 5)) which is adjacent to the pre-move cell in the positive direction of the Y-axis. In this case, as shown in FIG. 24, the coordinates of the destination cell are (5, 4) which are adjacent to the coordinates (4, 4) of the pre-move cell in the positive direction of the X-axis in which the touch pointer 57 has been moved.

Next, in step 132, the CPU 31 selects as designated vertices two vertices facing the destination cell set in step 131 of the pre-move cell. By this process, for example, in FIG. 24, a vertex d and a vertex g of the pre-move cell are selected as designated vertices. Thereafter, control goes to step 133.

In step 133, the CPU 31 performs the tile move vertex counting process which has been described above as the process of step 306 of FIG. 17 with respect to the two designated vertices selected in any of steps 126, 129 and 132 (see FIG. 18). Note that, as described above, the quantity and positions of tile move vertices are decided by the tile move vertex counting process.

Next, in step 134, the CPU 31 determines whether or not the quantity of the tile move vertices counted in step 133 is one, by referencing the move vertex quantity data Dp. When the quantity of tile move vertices is not one (NO in step 134), control goes to step 136. On the other hand, when the quantity of tile move vertices is one (YES in step 134), control goes to step 135.

In step 135, the CPU 31 moves the move target tile to the destination cell in the virtual game space by rotation using the tile move vertex decided in step 133 as a pivot. In the example of FIG. 5, a move target tile P is moved by rotation using a tile move vertex k as a pivot. Thereafter, control goes to step 138.

When the result of the determination in step 134 is NO, the CPU 31 determines, in step 136, whether or not the quantity of tile move vertices counted in step 133 is two, by referencing the tile move vertex quantity data Dp. When the quantity of tile move vertices is not two (NO in step 136; i.e., the quantity of tile move vertices is zero), control goes to step 118 of FIG. 14. On the other hand, when the quantity of tile move vertices is two (YES in step 136), control goes to step 137.

In step 137, the CPU 31 moves the move target tile to the destination cell in the virtual game space by flip-over using a line connecting the two tile move vertices decided in step 133 as a symmetry axis. In the example of FIG. 8, a move target tile P is moved by flip-over using a line connecting two tile move vertices c and b as a symmetry axis. Thereafter, control goes to step 138.

In step 138, the CPU 31 starts displaying animation in which the move target tile is moved to the destination cell. Note that, when control goes through steps 135 to 138, the CPU 31 displays animation in which the move target tile is moved to the destination cell by rotation, on the lower LCD 12, in step 138 (see FIG. 5). Also, when control goes through steps 137 to 138, the CPU 31 displays animation in which the move target tile is moved to the destination cell by flip-over, on the lower LCD 12, in step 138 (see FIG. 8).

Next, in step 139, the CPU 31 sets the move animation execution flag indicated by the move animation execution flag data Dg to ON.

Next, in step 140, the CPU 31 sets the destination cell to a pre-move cell. Specifically, the CPU 31 updates the pre-move cell coordinate data Dh with the coordinate data of the destination cell indicated by the destination cell coordinate data Dj. As a result, the move target tile can be continuously moved. Thereafter, control returns to step 105.

A case where control goes through steps 108 and 109 of FIG. 14 and thereafter the result of determination in step 109 is YES, will be described hereinafter. Specifically, a process which is performed at the moment when touch is released, will be described. In this case, control goes to step 141.

In step 141, the CPU 31 sets the touch flag indicated by the touch flag data Df to OFF.

Next, in step 142, the CPU 31 hides the silhouettes and the emphasized vertices displayed by the process of step 118 (see FIGS. 4 and 7).

Next, in step 143, the CPU 31 determines whether or not pipes possessed by tiles are in a predetermined state that the energy OBJ 52 is linked to a nozzle OBJ 51, i.e., a stage is complete, as shown in, for example, FIG. 10. When the pipes are not in the predetermined state (NO in step 143), control goes to step 110, and thereafter, returns to step 105. On the other hand, when the pipes are in the predetermined state (YES in step 143), control goes to step 144.

In step 144, the CPU 31 displays an image indicating that the current stage is complete, on the upper LCD 22 and the lower LCD 12. Specifically, for example, as shown in FIG. 11, an image in which energy is injected to the rocket 50 through the pipes linking the energy OBJ 52 and the nozzle OBJ 51 (see an arrow), so that the rocket 50 is launched by expelling exhaust 60 from the nozzle OBJ 51 as shown in FIG. 12, is displayed on the upper LCD 22 and the lower LCD 12.

Next, in step 145, the CPU 31 determines whether or not the current stage is a final stage. When the current stage is a final stage (YES in step 145), all the processes are ended and the game is ended. Alternatively, a screen indicating that all stages are complete (ending screen) may be displayed before the game is ended. On the other hand, when the current stage is not a final stage (NO in step 145), control goes to step 146.

In step 146, the CPU 31 selects the next stage. Thereafter, control returns to step 104. Note that the CPU 31 may cause the player to select the next stage. In this case, the process of step 146 is not performed, and control returns to step 102.

As described above, according to the present invention, a move target tile which the player desired to move takes a movement form (rotation movement or flip-over movement) varying depending on how another object(s) is adjacent to the move target tile. Also, according to the present invention, all vertices (displayed vertices) involved in determination of the movement form (rotation movement or flip-over movement) of each tile are displayed by open circles while the player is not touching any touch tile using a touch stylus or the like. Therefore, the player can predict the movement form (rotation movement or flip-over movement) of each tile. Also, according to the present invention, while the player designates a move target tile using a touch pointer, a silhouette(s) of the move target tile which will have been moved is displayed. As a result, the player can visually recognize a state of the move target tile which will have been moved. Also, according to the present invention, while the player designates a move target tile using a touch pointer, a vertex(s) (tile move vertex(s)) involved in decision of the movement form (rotation movement or flip-over movement) of the move target tile is emphasized by a double circle. As a result, the player can intuitively predict the movement form (rotation movement or flip-over movement) of the designated move target tile. Therefore, according to the present invention, a highly enjoyable game can be provided to the player.

Note that it has been assumed above that the touch pointer 57 is displayed as a star-like mark (see FIG. 4, etc.). The present invention is not limited to this as long as the player can visually recognize the display of the touch pointer 57. For example, the touch pointer 57 may be displayed as light emission or the like.

It has also been assumed above that a displayed vertex is displayed as an open circle (see FIG. 3). The present invention is not limited to this as long as the player can visually recognize the display of the displayed vertex. For example, the displayed vertex may be displayed as light emission or the like.

It has also been assumed above that an emphasized vertex is displayed as a double circle (see FIG. 4, etc.). The present invention is not limited to this as long as the player can visually recognize the display of the emphasized vertex. For example, the emphasized vertex may be displayed as light emission or the like. Note that the emphasized vertex is displayed in a manner which allows it to be more conspicuous than the displayed vertex.

It has also been assumed above that, when the player is not touching a touch panel, all vertices involved in decision of the movement form (rotation movement or flip-over movement) of each tile are displayed by open circles (see FIG. 3). However, these open circles may not be displayed. In this case, the player has difficulty in predicting the movement form of a tile, whereby the difficulty level of the game can be increased.

It has also been assumed above that, when the player designates a move target tile by a touch pointer, a vertex(s) (tile move vertex(s)) involved in decision of the movement form (rotation movement or flip-over movement) of the move target tile is displayed and emphasized by a double circle(s) (see FIG. 4, etc.). However, the double circle may not be displayed. In this case, the player has difficulty in predicting the movement form of the move target tile, whereby the difficulty level of the game can be increased.

It has also been assumed above that, when the player designates a move target tile by a touch pointer, a silhouette(s) of the move target tile which will have been moved is displayed (see FIG. 4, etc.). However, the silhouette may not be displayed. In this case, the player cannot visually recognize the movement form of the move target tile, whereby the difficulty level of the game can be increased.

Moreover, a predetermined mark (indication; e.g., a diamond-like mark, etc.) may be displayed instead of a silhouette. In this case, although the player cannot visually recognize a state of a move target tile which will have been moved, the player can recognize a cell(s) to which the move target tile can be next moved.

Figure 25:
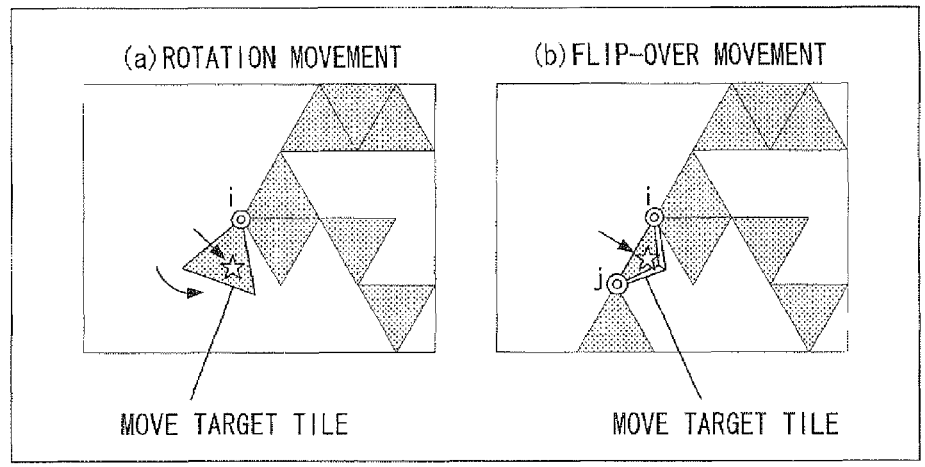
FIG. 25 is a diagram showing a movement form when tiles are in the shape of an equilateral triangle.
Figure 26:
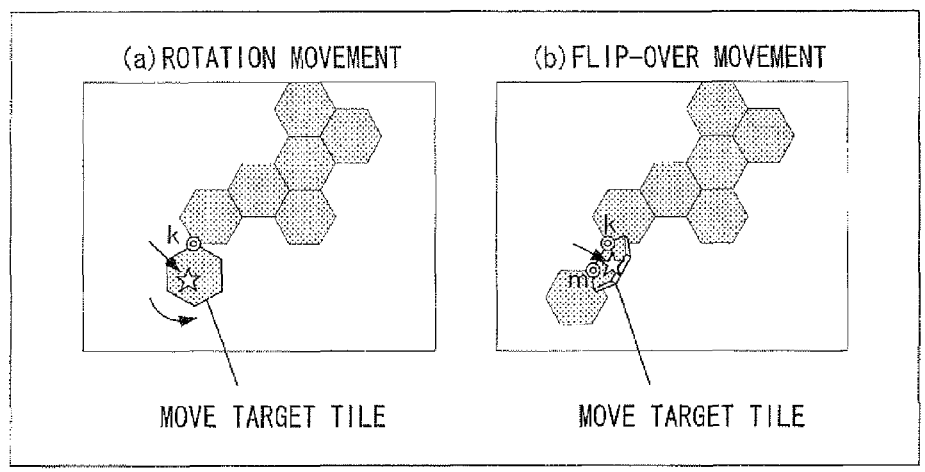
FIG. 26 is a diagram showing a movement form when tiles are in the shape of a regular hexagon.
Figure 27:
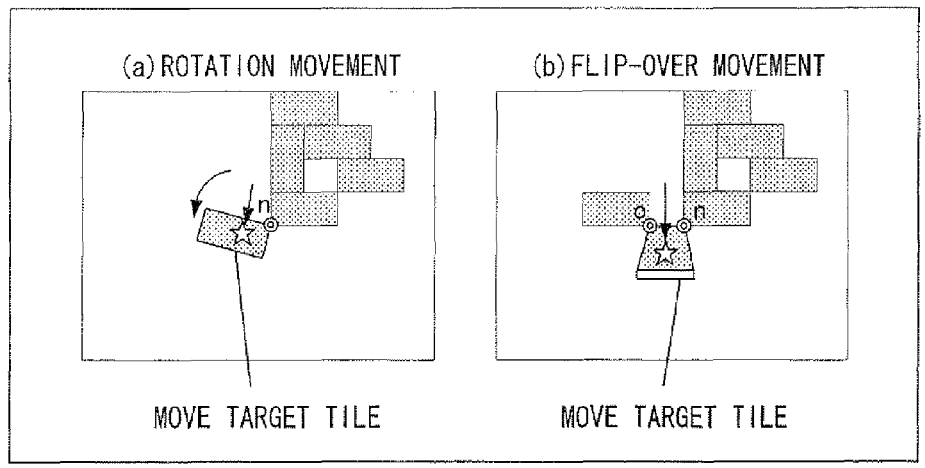
FIG. 27 is a diagram showing a movement form when tiles are in the shape of a rectangle.

It has also been assumed above that the cells and the objects are in the shape of a square. However, the shapes of the cells and the objects are not limited to this. For example, the cells and the objects may be in the shape of an equilateral triangle. In this case, for example, as shown in (a) of FIG. 25, the quantity of tile move vertices of an equilateral triangular move target tile is one, and therefore, the equilateral triangular move target tile may be moved by rotation using a tile move vertex i as a pivot. Also, for example, as shown in (b) of FIG. 25, the quantity of tile move vertices of an equilateral triangular move target tile is two, and therefore, the equilateral triangular move target tile may be moved by flip-over using a line connecting two tile move vertices i and j as a symmetry axis. Alternatively, for example, the cells and the objects may be in the shape of a regular hexagon. In this case, as shown in (a) of FIG. 26, the quantity of tile move vertices of a regular hexagonal move target tile is one, and therefore, the regular hexagonal move target tile may be moved by rotation using a tile move vertex k as a pivot. Also, for example, as shown in (b) of FIG. 26, the quantity of tile move vertices of a regular hexagonal move target tile is two, and therefore, the regular hexagonal move target tile may be moved by flip-over using a line connecting two tile move vertices k and m as a symmetry axis. Also, for example, the cells may be in the shape of a square and the objects may be in the shape of a rectangle obtained by coupling two square cells. In this case, for example, as shown in (a) of FIG. 27, the quantity of tile move vertices of a rectangular move target tile is one, and therefore, the rectangular move target tile may be moved by rotation using a tile move vertex n as a pivot. Also, for example, as shown in (b) of FIG. 27, the quantity of tile move vertices of a rectangular move target tile is two, and therefore, the rectangular move target tile may be moved by flip-over using a line connecting two tile move vertices n and o as a symmetry axis.

It has also been assumed above that the nozzle OBJs 51 and the energy OBJ 52 each have a transparent portion, and the tiles (L-shaped pipe tiles 53, I-shaped pipe tiles 54, and a non-pipe tile 55) each do not have a transparent portion. However, a tile may also have a transparent portion. For example, a tile may be a transparent square on which an image, a character or the like is drawn.

It has also been assumed above that, as an example, the tiles (movable objects) include L-shaped pipe tiles 53, I-shaped pipe tiles 54, and non-pipe tiles 55. However, other kinds of tiles may be included. For example, the tiles (movable objects) may include a cross-shaped pipe tile having a cross-shaped pipe. Also, similarly, objects other than the nozzle OBJ 51 and the energy OBJ 52 may be provided as immovable objects.

It has also been assumed above that, when the result of step 109 of FIG. 14 is NO, control goes to step 110. Alternatively, for example, when the result of step 109 of FIG. 14 is NO, control may go to step 143. In this case, both when the result of step 109 is YES and when the result of step 109 is NO, it is determined in step 143 whether or not a predetermined state that a state is complete has been reached.

It has also been assumed above that a puzzle game is used as an example, and a state in which predetermined objects are connected via linked pipes which are possessed by tiles is a predetermined state that a stage is complete. However, the predetermined state that a stage is complete is not limited to this. Pieces (objects) constituting a puzzle may reach a predetermined state. Moreover, a game executed by the present invention is not limited to puzzle games, and may be an object movement game in which objects are simply moved to create a shape which is desired by a player. In this case, it is not determined whether or not a stage is complete. Also, moreover, a game executed by the present invention may be an action game or the like in which a character may be moved using the aforementioned movement method (rotation movement or flip-over movement).

It has also been assumed above as an example that a move target tile is designated by touching and is moved by dragging while touching. A method of designating and moving a move target tile is not limited to this. For example, a move target tile may be designated by a first touch, a destination cell may be designated by the next touch, and the move target tile may be moved. Moreover, the operation button 14 may be used instead of the touch panel 13 to designate and move a move target tile. For example, the direction input button 14A may be operated to select a cell in which a tile is placed and the operation button 14B may then be pressed down to designate the tile as a move target tile, and thereafter, the direction input button 14A may be operated to move the move target tile. Also, moreover, a pointing device such as a mouse or the like may be used instead of the touch panel 13 to designate and move a move target tile. Also, one or more or all tiles may be previously set as move target tiles, and when a player touches a position where no object (including tiles) is present, the move target tiles may be moved toward the position by rotation or flip-over. Also, moreover, one or more or all tiles may be previously set as move target tiles, and when a player touches a position where no object (including tiles) is present and performs a dragging motion, the move target tiles may be moved in the dragging direction by rotation or flip-over.

It has also been assumed above that, in step 104 of FIG. 14, every time a stage is selected in step 103, the data of objects corresponding to the selected stage is read into the main memory 32 before being used. However, data of objects corresponding to all stages may be previously read into the main memory 32 in the initial setting of step 101, and thereafter, data of objects corresponding to a stage selected in step 103 may be used in step 104.

It has also been assumed above that the lower LCD 12 and the upper LCD 22, which are physically separated, are arranged vertically (two screens: an upper screen and a lower screen) as an example of a two-screen liquid crystal display unit. However, the two display screens may be arranged in other manners. For example, the lower LCD 12 and the upper LCD 22 may be arranged on one of the main surfaces of the lower housing 11. Also, for example, an LCD having a size corresponding to a combination of the lower LCD 12 and the upper LCD 22 may be provided on one of the main surfaces of the lower housing 11. Also, for example, only one of the lower LCD 12 and the upper LCD 22 may be provided, and images which are displayed on the lower LCD 12 in the description above may be displayed on the LCD provided.

It has also been assumed above that the touch panel 13 is integrated with the game apparatus 1. However, a game apparatus and a touch tile may be separately provided. Also in this case, the present invention can be carried out.

Also, a pointing device in other forms may be contemplated when the present invention is carried out using a stationary game apparatus in which a game is played by a player holding a game controller. For example, a camera attached to the housing of a game controller can be used as a pointing device. In this case, an image captured by the camera varies depending on a change in a position pointed out by the housing of the game controller. Therefore, by analyzing the captured image, the coordinates of the position pointed out by the housing with respect to a display screen can be calculated.

It has also been assumed above that the handheld game apparatus 1 is employed. Alternatively, an information processing apparatus, such as a typical personal computer or the like, may be used to execute the game program of the present invention, thereby carrying out the present invention.

Also, the shape of the game apparatus 1, and the shapes, number, positions and the like of the operation buttons 14 and the touch panel 13 are only for illustrative purposes. Even if other shapes, number and positions are employed, the present invention can be carried out. Also, the process sequence, set values, values for determination and the like used in the game process are only for illustrative purposes. Even if other process sequence, set values, values for determination and the like are employed, the present invention can be carried out.

While the invention has been described in detail, the foregoing description is in all aspects illustrative and not restrictive. It is to be understood that numerous other modifications and variations can be devised without departing from the scope of the invention.

What is claimed is:

1. A non-transitory computer readable storage medium storing an object movement game program for causing a computer of a game apparatus, including an input device and a display device, to execute:
    arranging a plurality of objects in a virtual game field, and causing the display device to display an image of the plurality of arranged objects;
    setting a move target object which is a target to be moved, from the plurality of objects;
    deciding a movement direction of the set move target object based on an input from the input device;
    determining whether or not a rotation movement condition or a flip-over movement condition is satisfied with respect to the decided movement direction;
    moving the move target object in a rotated form thereof in the movement direction when the rotation movement condition is satisfied; and
    moving the move target object in a flipped-over form thereof in the movement direction when the flip-over movement condition is satisfied.

2. The non-transitory computer readable storage medium according to claim 1, wherein
    the rotation movement condition is that a single predetermined point on a perimeter facing in the movement direction of the move target object contacts another object, and
    the flip-over movement condition is that two predetermined points on a perimeter facing in the movement direction of the move target object contact another object.

3. The non-transitory computer readable storage medium according to claim 1, wherein
    the objects each have a plurality of vertices,
    the object movement game program causes the computer to further:
        execute determining whether or not two vertices of the move target object are each a move vertex having a predetermined positional relationship with respect to another object, and
    the rotation movement condition is satisfied when one of the two vertices is the move vertex, and the flip-over movement condition is satisfied when the two vertices are both the move vertex.

4. The non-transitory computer readable storage medium according to claim 3, wherein
    the two vertices of the move target object are two vertices facing in the movement direction of the move target object.

5. The non-transitory computer readable storage medium according to claim 4, wherein
    when none of the two vertices is the move vertex, neither the rotation movement condition nor the flip-over movement condition is satisfied, and the move target object is not moved in the movement direction.

6. The non-transitory computer readable storage medium according to claim 3, wherein
    the move target object is moved in the movement direction by rotation using the determined move vertex as a pivot, and
    the move target object is moved in the movement direction by flip-over using a line connecting the determined two move vertices as a symmetry axis.

7. The non-transitory computer readable storage medium according to claim 3, wherein
    of the two vertices of the move target object, a vertex contacting another object is the move vertex.

8. The non-transitory computer readable storage medium according to claim 3, wherein
    the object movement game program causes the computer to further execute:
        determining whether or not each vertex of the move target object is a move vertex contacting another object, and
        emphasizing a determined move vertex and causing the display device to display the move vertex.

9. The non-transitory computer readable storage medium according to claim 1, wherein
    the object movement game program causes the computer to further:
        execute repeatedly detecting a designated position in the virtual game field based on an input from the input device, and
    a movement direction of the move target object is decided based on a change in the designated position.

10. The non-transitory computer readable storage medium according to claim 1, wherein
    the object movement game program causes the computer to further:
        execute causing the display device to display an indication indicating that the move target object can be moved, at a position to which the move target object can be next moved.

11. The non-transitory computer readable storage medium according to claim 10, wherein
    the display device displays an indication of an identifiable state of the move target object which will have been moved in a rotated or flipped-over form thereof, at a position to which the move target object can be next moved.

12. The non-transitory computer readable storage medium according to claim 1, wherein the move target object is set based on an input from the input device.

13. The non-transitory computer readable storage medium according to claim 1, wherein the object movement game program causes the computer to process a puzzle game, the object movement game program causes the computer to further:

execute determining whether or not an arrangement of the plurality of objects is in a predetermined state, and a form of the move target object which will have been moved varies between when the move target object is moved in a rotated form thereof in the movement direction and when the move target object is moved in a flipped-over form thereof in the movement direction.

14. The non-transitory computer readable storage medium according to claim 13, wherein whether or not a line diagram represented by the plurality of objects is in a game completed state in which a first point and a second point are connected is determined.

15. A game apparatus comprising:

an input device;

a display device;

an object display control device configured to arrange a plurality of objects in a virtual game field, and cause the display device to display an image of the plurality of arranged objects;

a move target object setting device configured to set a move target object which is a target to be moved, from the plurality of objects;

a movement direction deciding device configured to decide a movement direction of the set move target object based on an input from the input device;

a move condition determining device configured to determine whether or not a rotation movement condition or a flip-over movement condition is satisfied with respect to the movement direction decided by the movement direction deciding device;

a rotation movement control device configured to move the move target object in a rotated form thereof in the movement direction when the move condition determining device determines that the rotation movement condition is satisfied;

a flip-over movement control device configured to move the move target object in a flipped-over form thereof in the movement direction when the move condition determining device determines that the flip-over movement condition is satisfied.

* * * * *